(12) United States Patent
Stubblebine

(10) Patent No.: US 7,644,284 B1
(45) Date of Patent: *Jan. 5, 2010

(54) SPECIFYING SECURITY PROTOCOLS AND POLICY CONSTRAINTS IN DISTRIBUTED SYSTEMS

(76) Inventor: Stuart Gerald Stubblebine, 4 Knox La., Lebanon, NJ (US) 08833

( * ) Notice: Subject to any disclaimer, the term of this patent is extended or adjusted under 35 U.S.C. 154(b) by 962 days.

This patent is subject to a terminal disclaimer.

(21) Appl. No.: 09/840,230

(22) Filed: Apr. 24, 2001

Related U.S. Application Data

(63) Continuation of application No. 09/689,859, filed on Oct. 13, 2000, now Pat. No. 6,256,741, which is a continuation of application No. 08/847,489, filed on Apr. 25, 1997, now Pat. No. 6,216,231.

(60) Provisional application No. 60/016,788, filed on Apr. 30, 1996.

(51) Int. Cl.
   *H04L 9/00* (2006.01)
(52) U.S. Cl. .................. 713/178; 713/156; 713/158; 726/10
(58) Field of Classification Search .................. 713/178, 713/156, 158; 726/6, 10, 18
   See application file for complete search history.

(56) References Cited

U.S. PATENT DOCUMENTS

| | | | |
|---|---|---|---|
| 4,912,762 A | | 3/1990 | Lee et al. |
| 4,919,545 A | | 4/1990 | Yu |
| 5,010,572 A | | 4/1991 | Bathrick et al. |
| 5,699,431 A | * | 12/1997 | Van Oorschot et al. ........ 380/30 |
| 5,732,214 A | | 3/1998 | Subrahmanyam |
| 5,740,248 A | | 4/1998 | Fieres et al. |
| 5,745,574 A | * | 4/1998 | Muftic ........................ 713/157 |
| 5,841,870 A | | 11/1998 | Fieres et al. |
| 6,216,231 B1 | * | 4/2001 | Stubblebine ................... 726/10 |
| 6,256,741 B1 | * | 7/2001 | Stubblebine ................... 726/10 |

OTHER PUBLICATIONS

Abadi, Martin, Tuttle Mark R. "A Semantics for a Logic Authentication", 1991, ACM, pp. 201-216.*

Denning, Dorothy E., Sacco, Giovanni M. "Timestamps in Key Distribution Protocols", 1981, ACM, p. 533-536.*

Butler Lampson et al., "Authentication in Distributed Systems: Theory and Practice," ACM Trans. on Comp. Sys., 10(4): 265-10, Nov. 1992.

Joseph J. Tardo an Alagappan, K. "SPX: Global Authentication Using Public Key Certificates," Proc. $14^{th}$ National Computer Security Conference, NIST/NCSC, Baltimore 1991.

Stubblebine, S. and Gligor, V. "On Message Integrity in Cryptographic Protocols" Proc. IEEE Symposium on Security and Privacy, Oakland, 1992.

(Continued)

*Primary Examiner*—Kimyen Vu
*Assistant Examiner*—Edward Zee

(57) ABSTRACT

A recent secure authentication service enforcing revocation in distributed systems is provided. Authenticity entities impose freshness constraints, derived from initial policy assumptions and authentic statements made by trusted intermediaries, in authenticated statements made by intermediaries. If freshness constraints are not presented, authentication is questionable. The freshness constraints can be adjusted. The delay for revocation can be arbitrarily bounded. The freshness constraints within certificates results in a secure and highly available revocation service such that less trust is required of the service.

1 Claim, 21 Drawing Sheets

OTHER PUBLICATIONS

Neuman, B. Clifford, "Proxy-Based Authorization and Accounting for Distributed Systems." Proc. 13$^{th}$ Internet Draft, Mar. 95.

Barbara Liskov, "Practical Uses of Synchronized Clocks in Distributed Systems," Proc. 10$^{th}$ Annual ACM Symposium on Principles of Distributed Computing, Montreal, Aug. 1991, pp. 1-9.

Morrie Gasser and Ellen McDermott, "An Architecture for Practical Delegation in a Distributed System," Proc. IEEE Symp. on Security and Privacy, Oakland, 1990, pp. 20-30.

Li Gong, "A Security Risk of Depending on Synchronized Clocks," ACM Operating Syst. Rev., vol. 26, No. 1, pp. 49-53, Jan. 1992.

Kent, S. "Privacy Enhancement for Internet Electronic Mail: Part II: Certificate-Based Key Managements," RFC 1422, IAB IRTF PSRG, IET PEM WG, Feb. 1993.

Gasser, M. et al. "TI: Digital Distributed System Security Architecture," Proc 12$^{th}$ National Computer Security Conference, National Institute of Standards, and Technology, Baltimore, MD 1989.

Burrows, J.H. et al., "Digital Signature Standard (DSS)," May 1994, FIPS Pub 186, U.S. Dept. of Commerce Nat'l Institute of Standards and Technology, Gaithersburg, MD., Digital Signature Standard.

Ambler, E. et al., "Data Encryption Standard," National Bureau of Standards, Jan. 15, 1977 FIPS Pub 46.

Tung, B. et al., "Public Key Cryptography for Initial Authentication in Kerberos," Internet RFC 1510, American Bankers Association, Nov. 19, 1994, American National Standard X9.30-199X.

Herlihy, M.P. et al., "Hybrid Concurrency Control for Abstract Data Types," J. of Computer and System Sciences, vol. 43, Issue 1, Aug. 1991, pp. 25-61.

Berkovitz, S., "Public Key Infrastructure Study: Final Report," MITRE Corporation Technical Report, Apr. 1994.

Abadi, M., Burrows, et al., "A Calculus for Access Control in Distributed Systems," ACM Trans. program. lang. Syst., 15(4), Sep. 1993, pp. 706-734.

Denning, D., and Sacco, G., Timestamps in Key Distribution Protocols. Com of the ACM, vol. 24, No. 8, Aug. 1981, pp. 533-536.

Diffie, W. et al., "New Directions in Cryptography," IEEE Trans. Inf. Theor. IT-22, 6 (Nov. 1976), pp. 644-654.

Gligor, V., et al., "On Inter-Realm Authentication in Large Distributed Systems," Proc. 1992 IEEE Symp. on Research in Security and Privacy, May 1992.

Gong., L. "Increasing Availability and Security of an Authentication Service," IEEE J. on Selected Areas in Commun, vol. 11, No. 5, Jun. 1993, pp. 657-662.

Lamport, L. "Time, Clocks and Ordering of Events in a Distributed System," Commun Ass. Comput. Mach., vol. 21, pp. 558-565, Jul. 1978.

Neuman, B., et al., Kerberos: An Authentication Service for Computer Networks, IEEE Comunications, vol. 32, No. 9, Sep. 1994.

Rivest, R., et al., "A Method for Obtaining Digital Signatures and Public-Key Cryptosystem" Commun ACM 21, 2 (Feb. 1978), pp. 120-126.

Sollins, D., "Cascaded Authentication" proc. 1998 IEEE Symp. on Research in Security and Privacy, Apr. 1988, pp. 156-163.

Stubblebine, S., et al., "Protocol Design for Integrity Protection" Proc. IEEE Symposium on Security and Privacy, Oakland, 1993, pp. 41-53.

Yahalom, R. et al., "Trust-Based Navigation in Distributed Systems," Computing Systems, vol. 7, No. 1, Winter 1994, pp. 45-73.

* cited by examiner

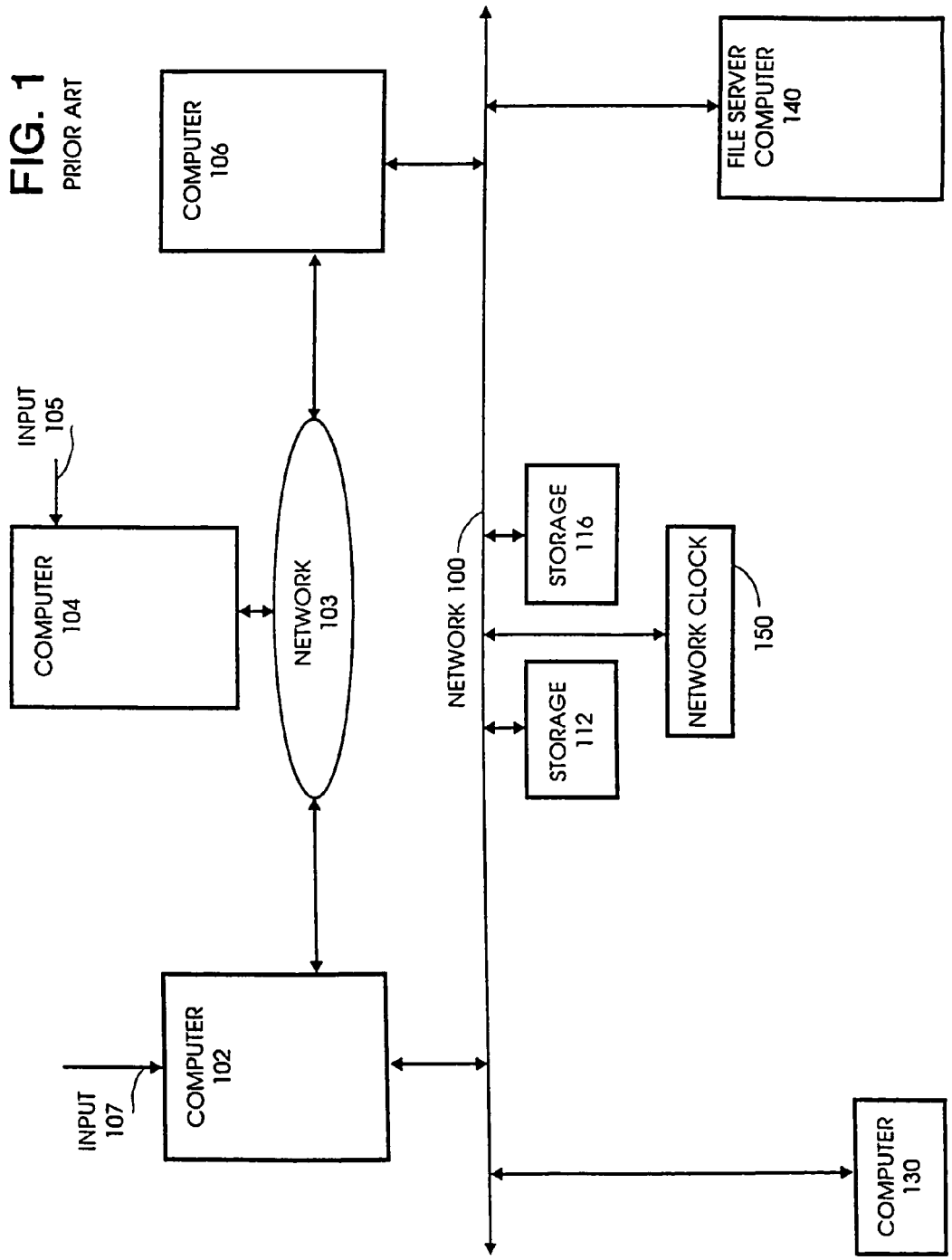

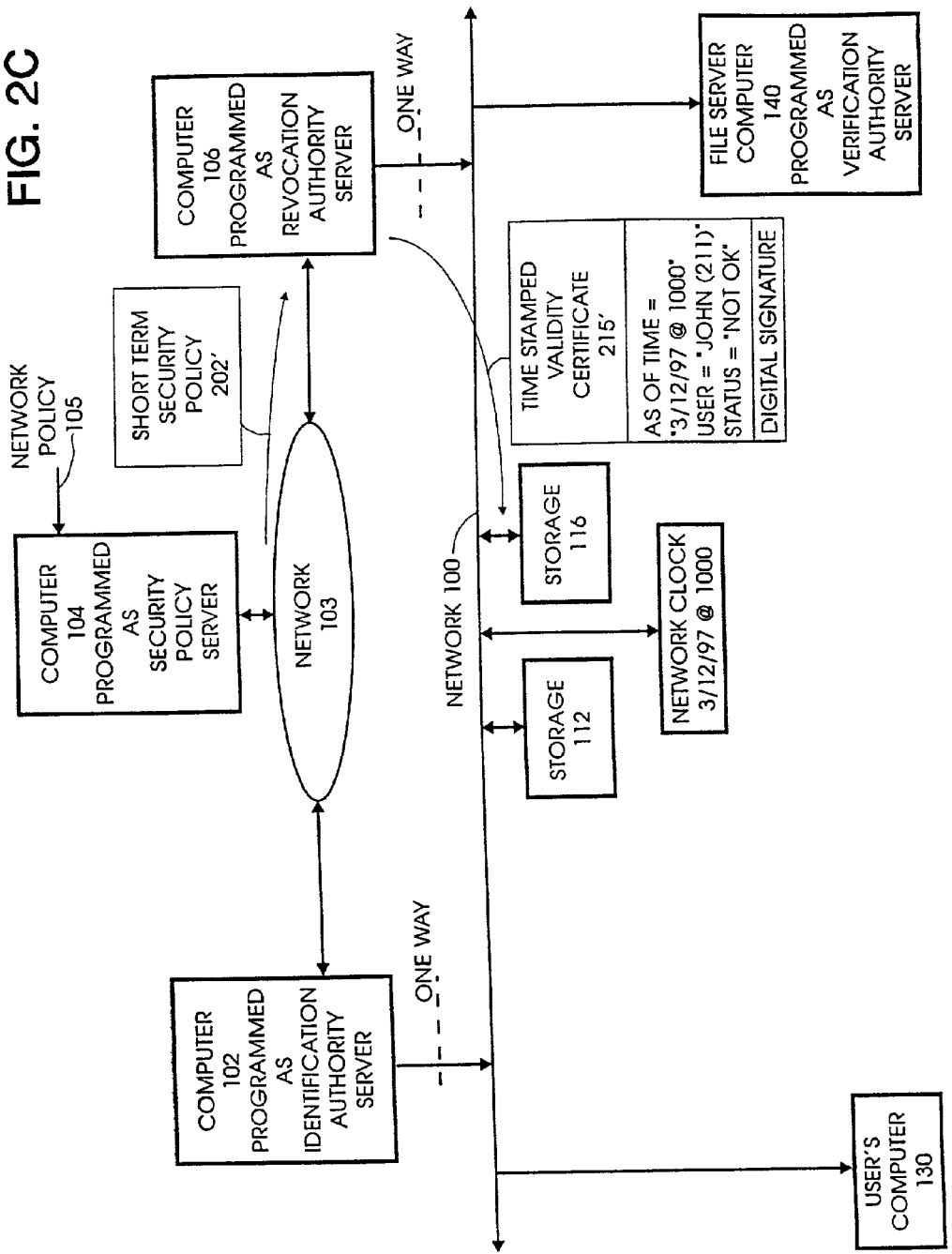

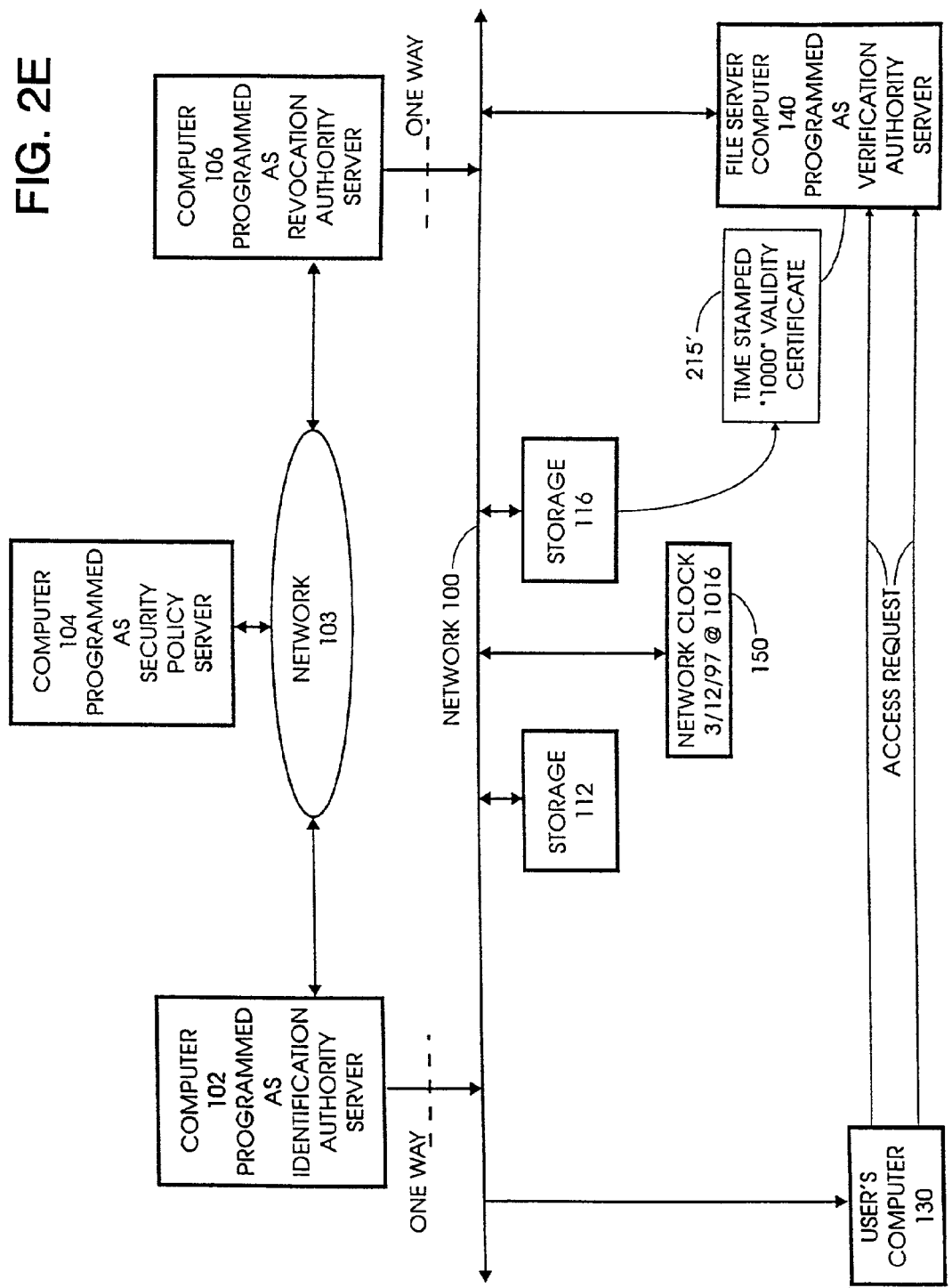

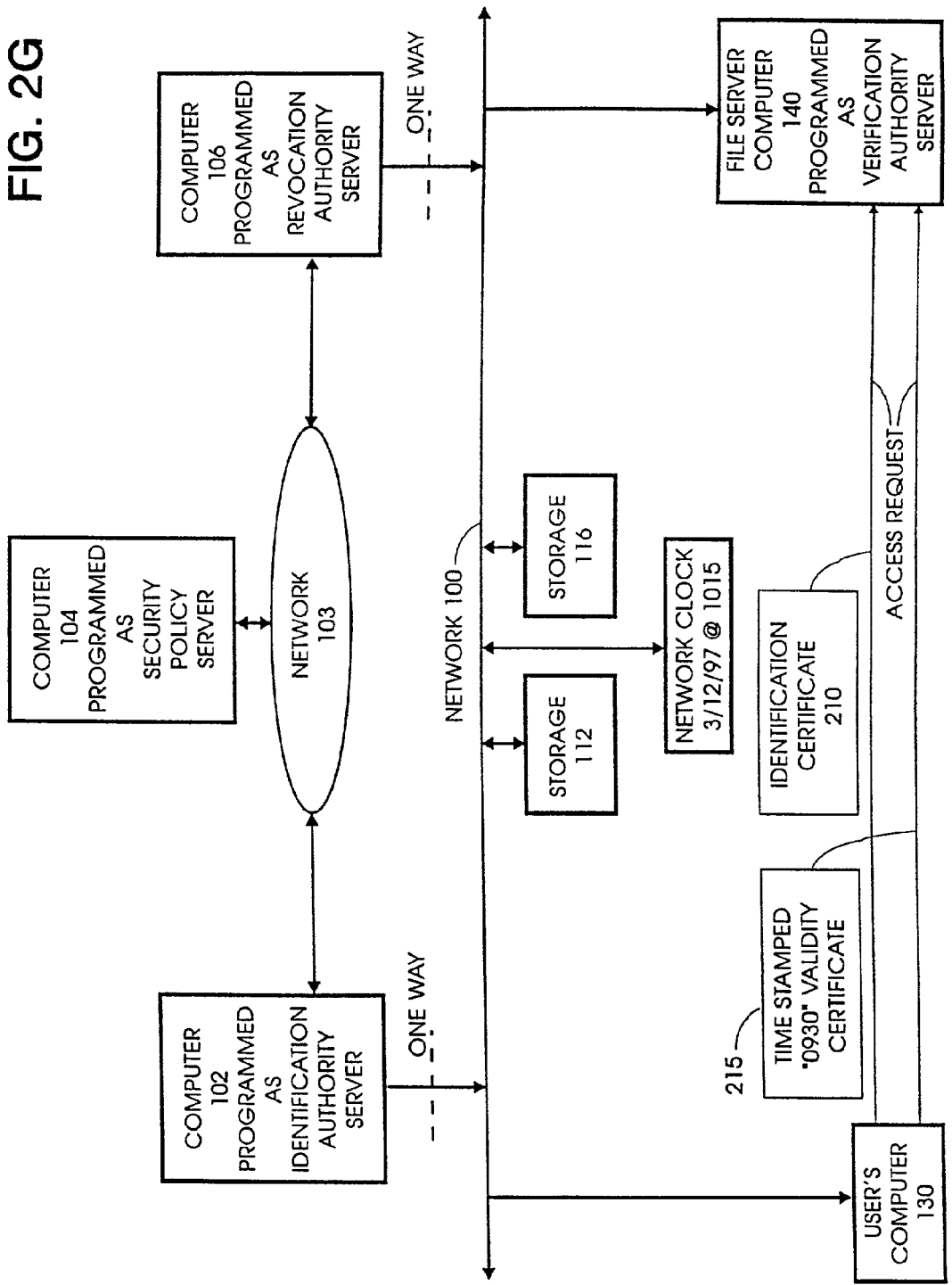

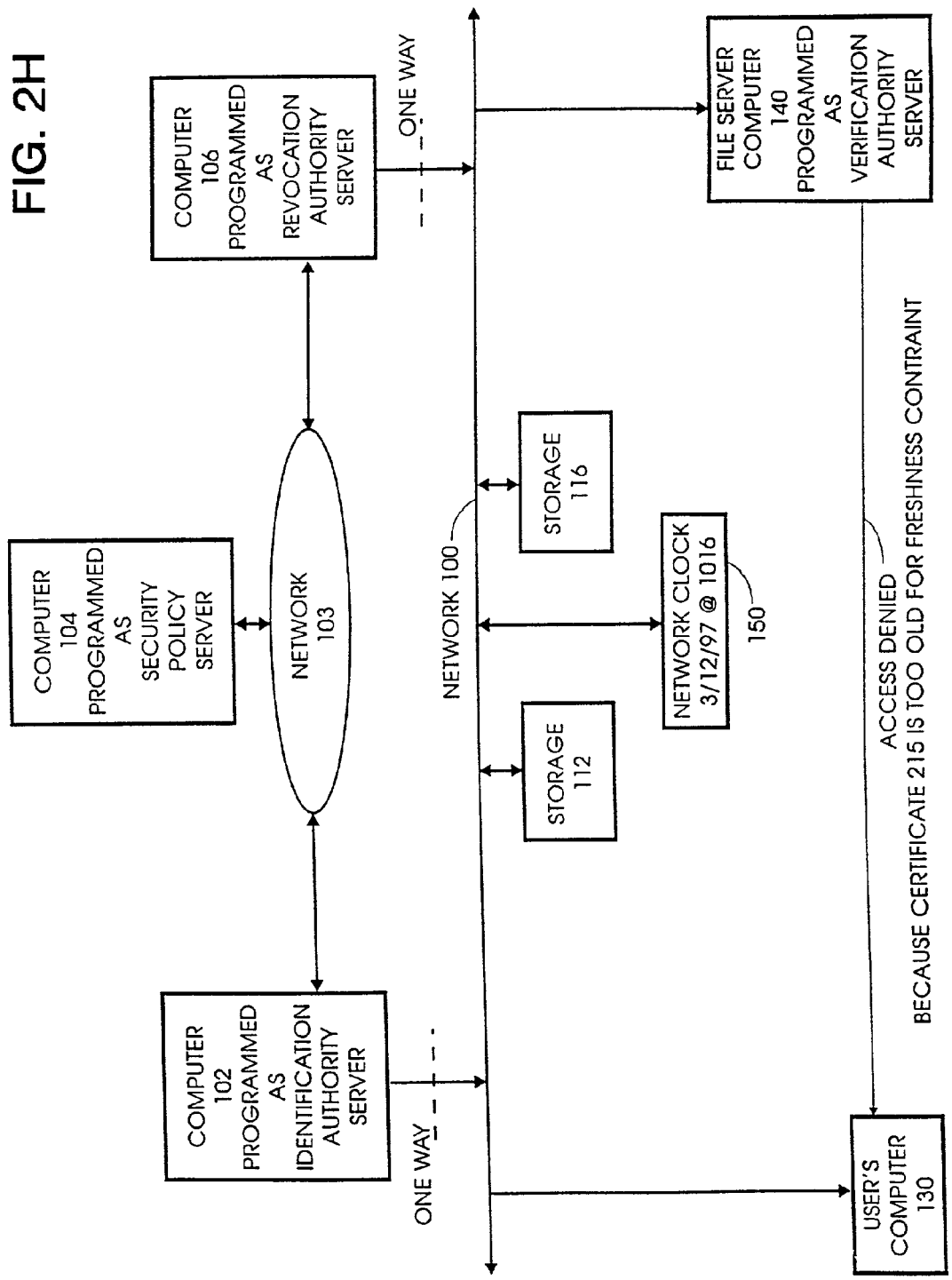

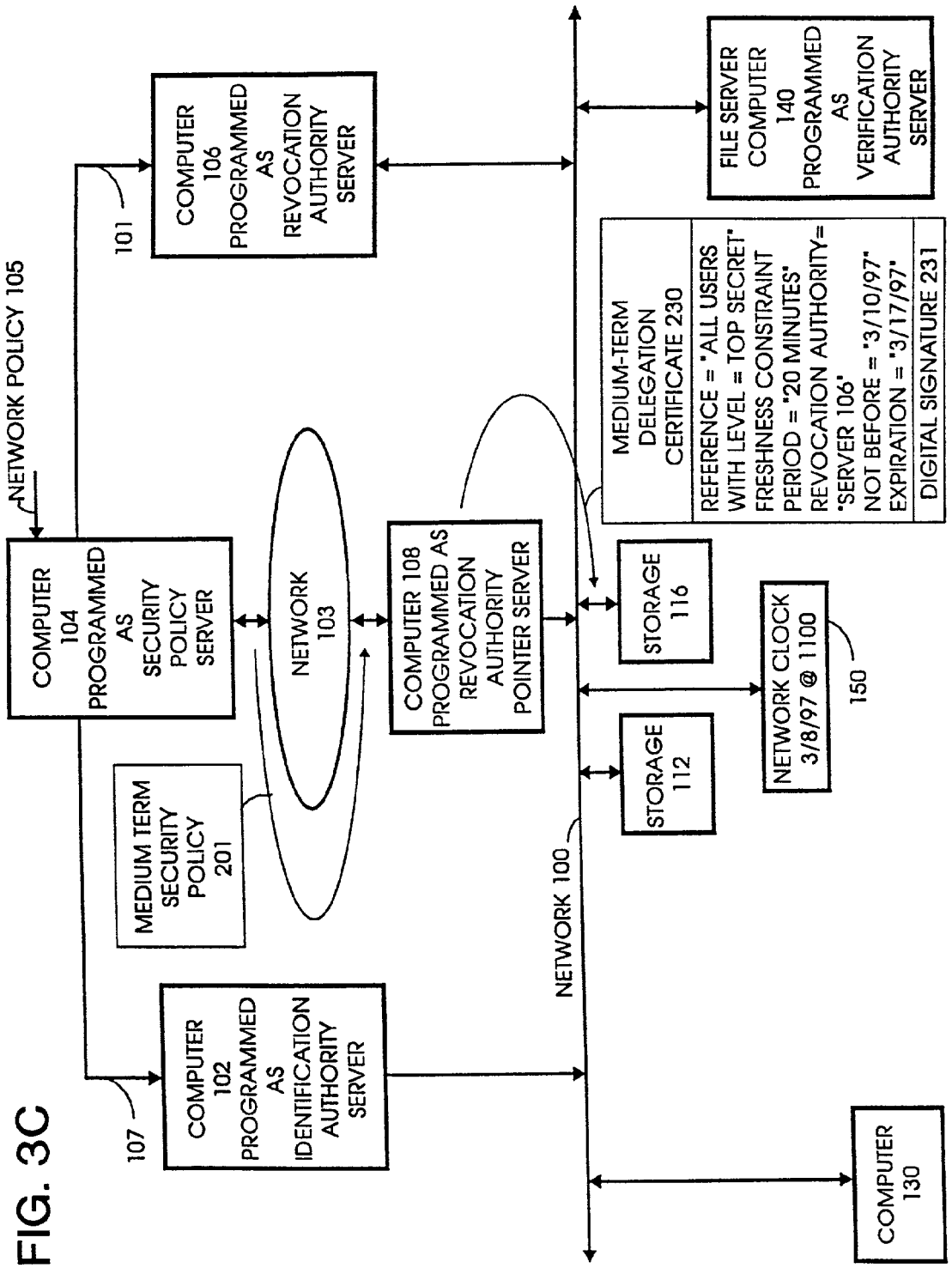

Replicated Directory with Varying Levels of Persistent Storage

SPECIFYING SECURITY PROTOCOLS AND POLICY CONSTRAINTS IN DISTRIBUTED SYSTEMS

This is a continuation of application Ser. No. 09/689,859, filed Oct. 13, 2000 now U.S. Pat. No. 6,256,741, which is a continuation of U.S. Ser. No. 08/847,489, filed Apr. 25, 1997 now U.S. Pat. No. 6,216,231.

I hereby claim the benefit under 35 U.S.C. 119(e) of the U.S. provisional application filed Apr. 30, 1996 and assigned Ser. No. 06/016,788.

FIELD OF THE INVENTION

The present invention is directed to specifying security protocols and policy constraints in distributed systems, and more particularly, to specifying security protocols and policy constraints for establishing secure channels in distributed systems using freshness constraints imposed on channel (recent-secure) authentication.

BACKGROUND OF THE INVENTION

Authentication architecture that scales globally is desirable to support authentication and authorization in electronic commerce. A characteristic of universal electronic commerce is that clients and commercial servers not previously known to one another must interact. An essential feature of an authentication service in large distributed systems is revocation. Revocation entails rescinding authentication and authorization statements that have become invalid. Revocation is needed because authentication information changes with time due to a compromise or suspected compromise of an entity's private key, a change of affiliation, or a cessation of an entity's operation. When a compromise is discovered, rapid revocation of information is required to prevent unauthorized use of resources and electronic fraud.

Revocation usually has the following properties. It should be fail-safe or assured with bounded delays, i.e., it should be definite. The mechanism for posting and retrieving updates must be highly available, and retrieved information should be recent if not current. Protection and performance trade-offs should be adjustable to suit varying risk adversity. When a compromise is discovered, delays in revocation should be decidedly bounded in time. A compromised revocation service should not allow illegitimate identification credentials to be issued.

However, there are factors which make revocation in a large distributed environment difficult. These factors include size, trust, security, the distributed nature of the system and the temporal dynamics of the system. That is, numerous entities not previously known to one another may need to interact securely. Entities have different views of the trustworthiness of intermediaries and of each other. Protection of computing environments is variable and uncertain. The authenticating entity's knowledge of authentication information can be inaccurate due to communication latency, failures, and active wiretapping. In addition, authentication and authorization information changes with time and is unpredictable.

There is little in the art focusing on revocation and validity assertions in large distributed systems. Kerberos and DCE (based on Kerberos) have been used in local autonomous realms in large distributed systems. However, shared secret crypto-systems such as these have inherent drawbacks when scaling to a large distributed system.

Authentication in large distributed systems is moving toward the integration of local network authentication servers with global directories (e.g., those based on the X.500 directory) and open authentication architectures (e.g., those based on the X.509 directory) using public key cryptography.

Global authentication architectures based on public key cryptography assume that named principals to be authenticated maintain the confidentiality of their private keys. Certificates using public key cryptography enable authentication information of the authority of the certificate contents to be distributed using servers that need not be trusted. Intermediaries, called certifiers or certification authorities (when authority is assumed by authenticating entities), create cryptographically protected statements called certificates. Identification authorities, having authority in identification of entities, issue identification certificates. Identification certificates assert that a public key is associated with an entity having a unique name. Revocation authorities, having authority on the status of certificates, issue revocation certificates. Revocation certificates assert the status of certificates previously issued. Revocation policies, which are typically included in authentication policies, represent a bounded delay before an authentication entity becomes current on the accuracy of authentication information. Authentication conforming to these policies is called recent-secure authentication. The entity or agent doing the authentication is called the authenticating entity. Propagation of certificates through servers, such as directory servers, can introduce delays.

As noted above, Kerberos is a distributed authentication service that allows a process (client) running on behalf of a principal (user) to prove its identity to a verifier (an application server or just a server) without sending data across the network that might allow an attacker or verifier to subsequently impersonate the principal. Kerberos can also provide integrity and confidentiality for data sent between the server and client. However, Kerberos does not protect all messages sent between two computers. It only protects the messages from software that have been written or modified to use it. Kerberos uses a series of encrypted messages to prove to a verifier that a client is running on behalf of a particular user. The service includes using "time stamps" to reduce the number of subsequent messages needed for basic authentication and a "ticket-granting" service to support subsequent authentication without reentry of a principal's password. It should be noted that Kerberos does not provide authorization, but passes authorization information generated by other services. Therefore it is used as a base for building separate distributed authorization services.

Recent-secure authentication is based on specified freshness constraints for statements made by trusted intermediaries (certifiers) and by principals that may be authenticated. These statements represent assertions regarding whose authenticity can be protected using a variety of mechanisms ranging from public or shared-key to physical protection. Freshness constraints restrict the useful age of statements. They can come from initial authentication assumptions and can also be derived from authentic statements which may themselves be subject to freshness constraints.

An important requirement of revocation in large distributed systems is the fail-safe property. This means that revocation is resilient to unreliable communication. Revocation mechanisms not satisfying this property can be impeded by active attacks in which the adversary prevents the reception of revocation statements. Apparent countermeasures to these attacks may not be adequate. For example, consider the technique of cascaded delegation where a delegation certificate is created as a delegation is passed to each new system. To terminate a delegation, a "tear down" order is passed down the chain. However, due to unreliable communication or a compromise of an intermediate system, the order may not fully propagate. To remedy this, it has been proposed that each intermediate delegate periodically authenticate delegates. However, periodic authentication of predecessor delegates can be vulnerable to attacks where the adversary steps down the chain blocking revocation statements until the particular link times out. The result is an additive effect on delaying revocation. Alternatively, each node could authenticate every other node at the cost of n2 messages, where n is the number of nodes. The optimal design for balancing performance and security depends on the protection of each system and the communication therebetween.

Communication latency is an inherent property of distributed systems. Consequently, authenticating entities cannot have perfect knowledge of authentication and authorization information. Therefore, failure can occur. The problem is compounded in large distributed systems. Additional certifiers represent more distributed knowledge.

Obtaining consistent knowledge of authentication data is difficult and prohibitively expensive. It is therefore necessary to quantify levels of protection that can be obtained and to reason whether they have been obtained. The practical significance of recent-secure authentication is that it enables distributed authenticating entities on a per-transaction basis to trade-off authentication costs against the level of protection.

In addition, quantifiable authentication assurances are difficult to provide if information about the intermediate system is incomplete. In spite of this, many systems operate with incomplete information. This requires the risk of operating such systems to be periodically reassessed. That is, entire industries have been dependent on reassessing shifting risks. Recent-secure authentication policies are an important variable for reassessing risk in large distributed systems. For example, proposals have been made to assign financial liability attributes to certificate authority statements in financial systems based on shifting risk.

A number of other related techniques have been proposed for effecting revocation in distributed systems. These techniques will be briefly reviewed.

With respect to certificate caches with exception notifications, authenticating entities may cache certificates and notify caches when there is a change. This approach is not well suited to large distributed systems since the notification mechanism is not fail-safe For example, an adversary could selectively block an exception notification. Also, it does not scale well if the destination caches need to be tracked. However, emergency notifications can augment a fail-safe scheme to possible shorten revocation delays provided messages reach their destinations sooner than the time-out periods. A distributed multicast infrastructure could alleviate the load on servers for distribution of notifications.

With respect to certificates having expiration times, a common technique for bounding the delay of revocation is placing explicit expiration times within certification. Statements using expiration times satisfy the fail-safe property provided that a certifier has not been compromised. Since authentication can depend on trusted intermediaries, an entity might be vulnerable to illegitimate statements made by a compromised certifier. Consequently, neither the certifier nor the authenticating entity can be assured that it or its subordinates have not been cloned due to a compromise of an arbitrary certifier that is trusted by an authenticating entity.

On-line servers and quorum schemes have been proposed whereby entities issue queries in an authenticated exchange to learn the validity of authentication/authorization information. Use of on-line servers may be justified in architectures where the server is local to the source or destination. However, network failures can significantly impact the availability of such servers for geographically distributed clients.

Replicating trusted servers for increasing availability inherently increases the risk of compromising the secret keys held by the server. Secret sharing techniques can improve availability and security, but they do so at the expense of considerable communication costs and increased delay. For example, the effective time of the statement from the quorum might be the earliest statement time in a final round used to make the decision. Due to communication costs and increased delay, geographic distribution of secret sharing servers, for the purposes of surviving network failures, may not be practical for most applications.

With respect to long-lived certificates and periodic revocation statements, revocation methods have been proposed where authorities issue long-term identification certificates and periodically publish time stamped revocation certificates. Revocation certificates can be distributed to the authenticating entity through untrusted communications.

The scalableness of this approach depends on whether servers are replicated. However, replicating the trusted identification authority inherently decreases security. In this case, a compromised server may enable an adversary to issue new identification certificates.

With respect to off-line identification authority and on-line revocation authority, an approach for increasing the availability and security of an authentication service calls for joint authorities. An off-line identification authority generates long-term certificates and an on-line revocation authority creates countersigned certificates with short lifetimes. The effective lifetime is the minimum lifetime of both certificates.

The joint authority approach benefits from the fact that the compromise of the on-line server does not enable the adversary to issue new identification certificates. As expected, a compromised revocation authority could delay revocation until the authority of the on-line server expires. However, the period of compromise may be extended further if the revocation authority issues revocation certificates with longer lifetimes.

An alternative approach to creating countersigned certificates is to authenticate a channel to an on-line (trusted) database server and to retrieve original certificates. However, authenticated retrieval of certificates alone may be insufficient to provide adequate assurance that a certificate is current. For example, when providing high availability for geographically distributed clients, the revocation service might replicate the database and use optimistic consistency control techniques. These techniques do not guarantee the consistency of stored certificates at the time of retrieval. Consequently, the presence of a certificate in a local replica might represent stale information. Additional delays occur as certificates are exported to trusted subsystems for local retrieval. Also, the on-line revocation server/database is subject to the scaling limitations inherent to on-line servers as discussed above.

As set forth above, neither Kerberos nor any other authentication system focuses on revocation and validity of assertions in large distributed systems. These prior systems all have inherent problems regarding revocation in complex systems.

SUMMARY OF THE INVENTION

The present invention provides improved system security in distributed systems by making precise what degree of protection is desired and obtained. Freshness constraints and time stamped certificates are employed to enforce revocation. In addition, recent-secure policies associated with statements of authentication liability are provided based on axioms and principals.

The present invention provides system security in distributed systems by making authentic statements by trusted intermediaries, deriving freshness constraints from initial policy assumptions and the authentic statements, and imposing freshness constraints to effect revocation. Revocation can be arbitrarily bounded by adjusting the freshness constraints and applying certain principles.

Generally, revocation is enforced by distinguished principals issuing initial assertions and by asserting the validity of the initial assertions at a time specified by a time stamp. The distinguished principals assert one or more principals with authority for asserting a time stamped validity assertion. Freshness constraints are asserted indicating a length of time. A relation is verified for each assertion necessary to verify a secure channel.

In addition, for a more specific example, system security in distributed systems is provided by using identification authorities for issuing long-lived identification certificates, using revocation authorities for issuing time stamped certificates, and posting updates to the revocation authorities. The identification authorities also specify freshness constraints for revocation within an identification certificate. The revocation authority can be the identification authority.

Another method for enforcing revocation includes designating a policy certification authority for dictating policy to subordinates, designating an organization for receiving policy from the policy certification authority, designating entities within the organization, issuing a delegation certificate specifying an entity authorized as an authority for issuing time stamped revocation certificates, and issuing time stamped revocation certificates from the authority. The time stamped revocation certificates are issued in an unidirectional manner. The authority can use freshness constraints when issuing the time stamped revocation certificates.

A revocation system can include an identification authority for issuing long-lived identification certificates and a revocation authority for issuing time stamped revocation certificates, the identification authority and the revocation authority having only unidirectional communication to a network. The identification authority specifies freshness constraints for revocation within the identification authority and the revocation certificates meet the specified freshness constraints.

Further, a revocation system for use in a distributed system includes a policy certification authority for dictating policy, an organization dictated to by the policy certification authority and issuing identification certificates, entities for receiving the identification certificates from the organization, delegation certificates containing information specifying an entity as an authority for issuing time stamped revocation certificates, and a revocation authority for issuing the time stamped revocation certificates to the entity.

The revocation authority can provide the time stamped revocation certificates at a predetermined time or on demand. The system can also include a storage location for obtaining certificates. The storage location can include a replicated directory having varying levels of persistent storage. The replicated directory includes a high level directory for frequently replicating information, a medium level directory for often replicating information, and a low level directory for infrequently replicating information. The high level directory includes the time stamped revocation certificates, the medium directory includes the time stamped revocation certificates and the delegation certificates, and the low level directory includes the time stamped revocation certificates, the delegation certificates, and the identification certificates.

These and other objects, advantages, and salient features of the present invention will become apparent from the following detailed description which, when taken in connection with the annexed drawings, discloses preferred but non-limiting embodiments. In the drawings, like reference numerals refer to like parts throughout.

BRIEF DESCRIPTION OF THE DRAWINGS

FIG. 1 is an architectural diagram of a prior art computer network within which the invention can be applied.

FIG. 2C is an architectural diagram showing the example of the implementation of an embodiment of the invention in the prior art computer network of FIG. 1, when the network clock is "Mar. 12, 1997 @ 1000".

FIG. 2E is an architectural diagram showing the example of the implementation of an embodiment of the invention in the prior art computer network of FIG. 1, when the network clock is "Mar. 12, 1997 @ 1016".

FIG. 2G is an architectural diagram showing an example of the implementation of a modified embodiment of the invention in the prior art computer network of FIG. 1, at the same stage as in FIG. 2D when the network clock is "Mar. 12, 1997 @ 1015".

FIG. 2H is an architectural diagram showing the example of the implementation of the modified embodiment of the invention in the prior art computer network of FIG. 1, at the stage following FIG. 2G, when the network clock is "Mar. 12, 1997 @ 1016".

FIG. 3C is an architectural diagram showing the example of the implementation of the second embodiment of the invention in the prior art computer network of FIG. 1A, showing revocation authority pointer computer 108 issuing medium-term delegation certificate 230 when the network clock is "Mar. 12, 1997 @ 1100".

DESCRIPTION OF THE PREFERRED EMBODIMENTS

Figure 1A:
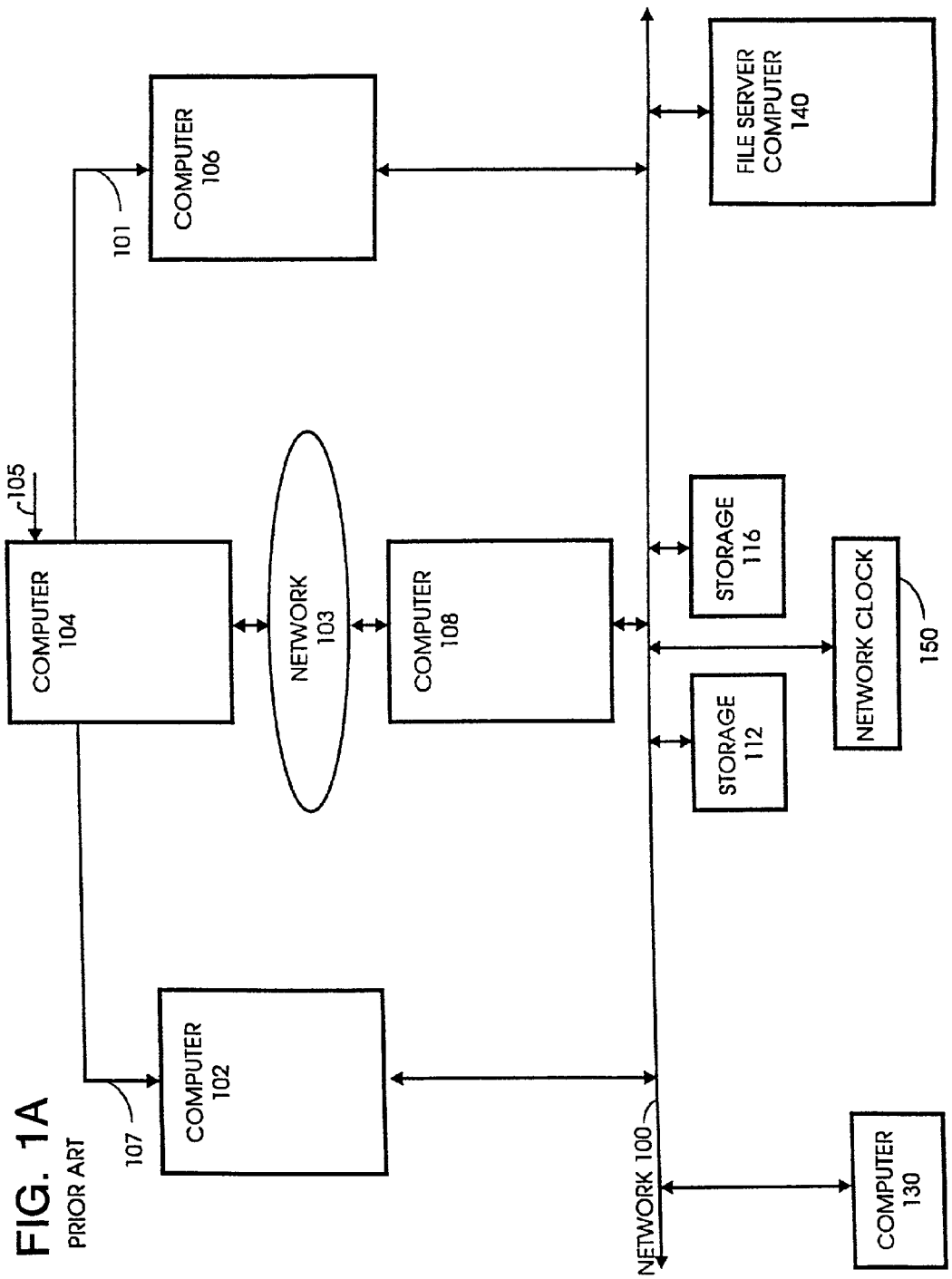
FIG. 1A is an architectural diagram of another prior art computer network within which the invention can be applied.

The concept of specifying security protocols and policy constraints for establishing secure channels in distributed systems will be explained in conjunction with related systems. In particular, recent-secure authentication can be related to a hybrid optimistic/pessimistic method of concurrency control that allows for the selective application of the most efficient method characterized by the probability of conflict. For example, small freshness intervals correspond to a pessimistic method requiring more expensive mechanisms than those required by larger freshness intervals.

To effect revocation, authenticating entities impose freshness constraints, derived from initial policy assumptions and authentic statements made by trusted intermediaries, on credentials or authenticated statements made by the trusted intermediaries. If freshness constraints are not presented, then the authentication is questionable. By adjusting freshness constraints the delay for certain revocation can be arbitrarily bounded. This is important since zero delays can not be achieved in large distributed systems due to communication latency. Freshness constraints within a certificate enables the design of a secure and highly available revocation service.

Before describing the present invention in detail, the theory for specifying temporal features of statements made by entities and rules for reasoning about them are presented. The primary feature of the present invention is attaining recent-secure authentication rather than specifying implementation algorithms for maintaining recent-secure channels.

Performance optimizations and increased assurance can be realized if policies for querying entities can be refined and the reasoning behind the policies is formally analyzed. Recent-secure authentication is necessary both during initial authentication as well as during a session since revocation can occur at any time.

Principals can be used as the basis for specifying freshness constraints and can be classified according to freshness classes. Freshness constraints can be in identification certificates, separate certificates, or specified by whoever is an authority. An authority is an entity who assumes risk. A freshness constraint associated with a principal can depend on an identification authority's certificate issuance policy since this policy specifies security relevant information such as the randomness of keys, software and hardware protection for key management, identification, and authentication requirements for certificate registration. It should be noted that many policies may exist within an identification authority's certificate. A brief review of the theory of secure channels will now be given.

System specification includes specifying system entities stating assumptions about synchronization bonds between clocks of principals, annotating initial assumptions and messages using mathematical relationship statements and interpreting certificate policies as constraints on axiomatic derivations. All entities in a system are referred to as principals. A distinguished principal is an authenticating entity which authenticates a channel. Basic named principals are entities that cannot say things directly on a computer. For example, they can be people i.e., Bob, groups of people or roles such as "identification authority." Channels or channel principals are principals that can say things directly. An I/O port is an example of a channel that reports the receipt of a message. A key i.e., $K_{Bob}$ and cryptographic algorithm is an example of a channel that makes cryptographic statements. Cryptographic channels are of primary interest when communication transits untrusted domains and is subject to wiretapping.

Initial assumptions are messages annotated as formulas using "speaksfor" and "says" statement. If $K_{Bob}$ and Bob are principals then $K_{Bob} \Rightarrow$ Bob is a statement. The symbol $\Rightarrow$ "speaksfor" relation. Suppose $K_{Bob}$ is a channel and Bob is a named principal, then the above statement allows one to deduce that the channel $K_{Bob}$ represents Bob.

If IA is a principal and s is a statement then IA says s is also a statement. If "IA says s" one can proceed as though IA is willing to say s. It does not necessarily mean that IA had actually articulated the statement. For example, one may have derived this from the axioms. It should be noted that a principal could be lying.

For acceptable performance, basic channel principals can have clocks that are loosely synchronized to an external time reference or synchronized with other clocks. Clocks can be used for annotating message time stamps. Synchronization bounds on clocks of principals are specified as initial assumption of channel principals. Assumptions about synchronization bounds can be represented as:

$$/clock(P_1, t) = clock(P_2, t)/ \leq \text{Synchronization bound}(P_1, P_2)$$

where clock (P,t) represents the time on P's clock at the real time t and Synchronization bound ($P_1, P_2$) represents the synchronization bound. The channel's synchronization accuracy is known to other principals and the authenticating entity. Loosely synchronized clocks are used to expire keys and to age statements. The accuracy of clock synchronization constrains the granularity for aging statements and expiring keys. Granularity constraints on expiring keys are not a practical problem in situations where sufficiently pessimistic assumptions can be made by assigning key lifetimes. However, granularity is an issue for fail-safe revocation since the practical bound on revocation may need to be on the order of tens of minutes or less. The reliance on clock synchronization for refreshing statements makes recent-secure authentication susceptible to vulnerabilities due to clock failures. Therefore, the assumption of synchronized clocks must be carefully scrutinized.

The present invention assumes that statements from each channel principal can be ordered and missing statements can be detected. In practice, this requirement can be carefully relaxed. For example, if statements can be ordered and each statement provides a complete interpretation, then interpretation of missing statements may be unnecessary. Also, the order of statements from different sources can be established using clock synchronization and external synchronization accuracies can be determined.

A principal may also assert a statement and a time attribute. For example, $$K_{IA} \text{ says s at t.}$$

It is not necessarily a fact in this statement that a principal says s at time t. As mentioned above, a principal could be lying. However, this axiom captures the notion that if one trusts a principal and is able to discern a statement made by it, then one can also trust the facts concerning the statement's time attribute. Not all "says" statement's have time attributes.

"Speaksfor" relations are given time constraints. The time constraints are specified using a <<notbefore>> and "notafter" suffix. For example, the statement $$K_{Bob} \Rightarrow \text{Bob notbefore } t_1 \text{ notafter } t_2$$

indicates that during the closed interval $[t_1, t_2]$, $K_{Bob} \Rightarrow \text{Bob}$.

For analysis purposes, individual messages such as public key certificates are first interpreted as statements. Then, it must be determined whether there has been an unambiguous interpretation. If so, the axioms related to the present invention are employed. Examples will now be given with respect to interpreting authentication message types (certificates) and formalizing them as statements.

In practice, an identification certificate (sometimes referred to as a certificate) contains identifying information of an entity together with its associated keying material and possibly other information such as an expiration date. The identification certificate is cryptographically protected by using the key of an identification authority. The interpretation of an X.509 and Internet Society's (X.509 compliant) IPRA identification certificate is represented as $$K_{IA} \text{ says}(K_{IA/Bob} \Rightarrow \text{IA/Bob notbefore } t_1, \text{notafter } t2)$$

$K_{IA}$, which is the identification authority's key, asserts the $\Rightarrow$relationship between ($K_{IA/Bob}$ and A/Bob between the validity interval $[t_1, t_2]$. Since a time stamp is not in the identification certificate, the time is annotated. Consequently, from the above statement, the authentication entity cannot determine the recentness of the statement.

Where the identification authority can be adequately protected, architectures may use identification certificates as the primary basis for determining freshness. Since none of the current standards specify a time stamp within the identification certificate, the X.509 certificate format with a time stamp is assumed as follows:

$$K_{CA} \text{ says}(K_{CA} \Rightarrow \text{Bob notbefore } t_1 \text{ notafter } t_2) \text{ at } t_3.$$

A certificate revocation list (CRL) or revocation certificate indicates what certificates have changed in "status." The interpretation of a revocation certificate typically has the format of the time stamped identification certificate. The interpretations of the revocation certificates can be summarized as follows.

The absence of a referenced identification certificate implies that it is "current" at the time of the revocation certificate. This interpretation asserts the interpretation of the referenced identification certificate with the time of the revocation certificate.

When the referenced certificate is invalid or is about to be invalid it is referred to as "revoked." This interpretation reasserts the original statement specifying a "notafter" time corresponding to the revocation date. If the time stamp is present the time of the statement is annotated.

When the certificate binding is extended to a new time it is referred to as being "extended." This interpretation reasserts the original statement and the "notafter" time is set for the new time. If the time stamp is present the time of the statement is annotated. If the certificate is temporarily suspended, it is referred to as being "suspended." This interpretation consists of two statements: a statement indicating a "notafter" time set sooner than the original certificate; and a new statement with a "notbefore" time set at a later time. If a time stamp is present, the time of the statement is annotated.

Initial assumptions and messages as used in the present invention as formulas will now be annotated using "speaks for" and "says" statements. Some are repeated for clarity and completeness.

The following syntax will be used in annotating formulas. The notation ⊢s means that s is an axiom of the theory or is provable from the axioms. That is, the truth of s is an assumption and can be derived. The symbol $\supset$ means implies. The symbol $\Rightarrow$is the "speaksfor" relation between principals. The symbol $t_{now}$ represents the time of verification.

Formulas are defined inductively, as follows. A countable supply of primitive propositions pO, p1, p2, . . . are formulas. If s and s' are formulas then so are ¬s and s∧s'. If A and B are principal expressions the following are formulas:

$$A \Rightarrow B \text{ notbefore } t_1 \text{ notafter } t_2; \text{ and}$$

$$A \text{ says s at t.}$$

Statements are inductively defined according to the following axioms. The axioms for statements are as follows:

| | |
|---|---|
| If s is an instance of a propositional-logic tautology then ⊢s. | (S1) |
| If ⊢s and(⊢s $\supset$ s')then ⊢s'. | (S2) |
| ⊢(A says(s $\supset$ s')at t) $\supset$ ((A says s at t) $\supset$ A says s at t)). | (S3) |
| If ⊢s then ⊢A says s at $t_{now}$,for every principal A. | (S4) |

From(S1)-(S4)the following theorem is obtained.

| | |
|---|---|
| ⊢A says(s∧s')at t≡(A says s at t∧A says s at t). | (S5) |

The axioms for principals are as follows:

| | |
|---|---|
| ⊢∧ is associative,commutative and idempotent. | (P1) |
| ⊢\| is associative. | (P2) |
| ⊢\| distributes over ∧in both arguments. | (P3) |

Additional axioms for principals include the time of a statement made by (A∧B) is equivalent to both A and B saying it at the same time.

$$\vdash (A \wedge B) \text{says } s \text{ at } t \equiv (A \text{ says } s \text{ at } t) \wedge (B \text{ says } s \text{ at } t). \quad (P4)$$

B quoting A at time t has the definition:

$$\vdash (B|A) \text{says } s \text{ at } t \equiv\equiv B \text{ says}(A \text{ says } s \text{ at } t) \text{at } t. \quad (P5)$$

The following new axiom is introduced in (P6). This axiom allows more restrictive relations to be obtained from less restrictive ⇒relations. This axiom is used to normalize suffix constraints prior to applying other rules such as the transitivity of ⇒.

$$\vdash (A \Rightarrow B \text{ notbefore } t_1 \text{ notafter } t_2) \supset (((t_1 \leq t_3)$$
$$\wedge (t_4 \leq t_2)) \supset A \Rightarrow B \text{ notbefore } t_3 \text{ notafter } t_4). \quad (P6)$$

In addition:

$$\vdash (A \Rightarrow B \text{ notbefore } t_1 \text{ notafter } t_2) \supset (((A \text{ says } s \text{ at } t_3)$$
$$\wedge (t_1 \leq t_{now} \cdot t_3 \leq t_2)) \supset (B \text{ says } s \text{ at } t_3)). \quad (P7)$$

The ⇒relation in (P7) allows removal of a level of indirection. The constraint $t_1 \leq t_3 \leq t_2$ is meaningful if the principals are trusted not to lie. For example, revocation authorities are trusted not to lie when specifying the time of revocation certificates. This hand-off axiom (P7) allows principals to derive new facts as follows:

$$\vdash (A \text{ says}(B \Rightarrow A \text{ notbefore } t_1 \text{ notafter } t_2) \text{at } t_3) \supset (B \Rightarrow A$$
$$\text{notbefore } t_1 \text{ notafter } t_2). \quad (P8)$$

FIG. 1 is an architectural diagram of a prior art computer network within which the invention can be applied. The prior art network of FIG. 1 includes a public network 100 and a private network 103. The public network 100 includes a computer 130, a file server computer 140, a network clock 150, and network storage devices 112 and 116. The private network 103 includes computer 102 that has an input 107, computer 104 that has an input 105, and computer 106. Computers 102 and 106 are also connected to the public network 100.

Figure 2A:
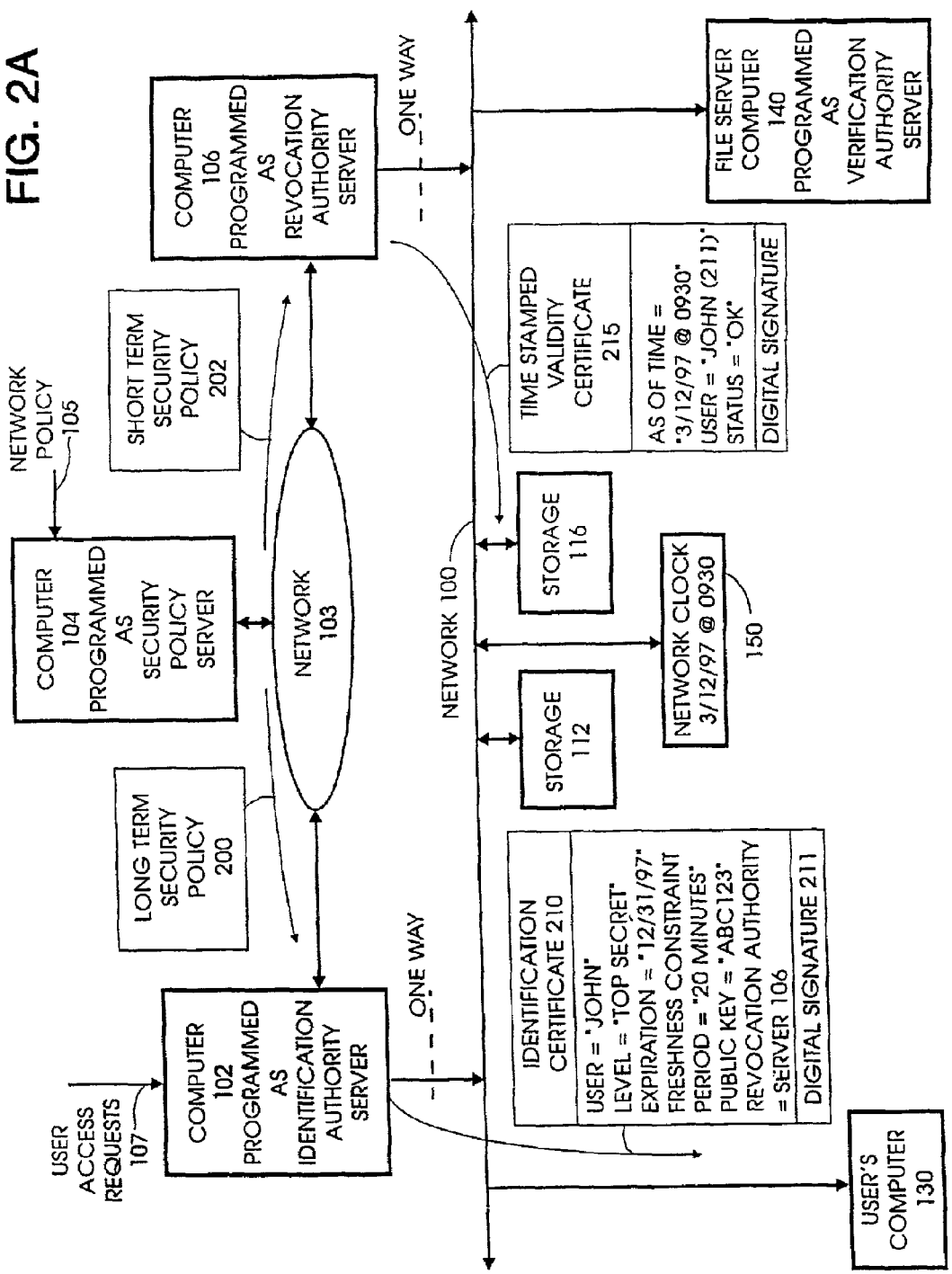
FIG. 2A is an architectural diagram showing an example of the implementation of an embodiment of the invention in the prior art computer network of FIG. 1, when the network clock is "Mar. 12, 1997 @ 0930".

FIG. 2A is an architectural diagram showing an example of the implementation of an embodiment of the invention in the prior art computer network of FIG. 1, when the network clock 150 is "Mar. 12, 1997 @ 0930". FIG. 2A includes the public network 100 and the private network 103. The public network 100 includes the computer 130 operated by a user. The file server computer 140 is programmed, in accordance with the invention, as a verification authority server. The private network 103 includes the computer 102 programmed, in accordance with the invention, as an identification authority server. User access requests are applied at input 107. The computer 104 is programmed, in accordance with the invention, as a security policy server and the input 105 provides network security policy inputs. The computer 106 is programmed, in accordance with the invention, as a revocation authority server. Computers 102 and 106 are connected for one way information flow toward the public network 100.

When computer 104 receives a network security policy input at the input 105 in FIG. 2A, the policy input can be directed for example, to establishing a long term identity of the user in the network and establishing the user's short term security status. The security policy server of computer 104 prepares a long term policy message 200 that it sends to computer 102 and it prepares a short term policy message 202 that it sends to computer 106. The identification authority server of computer 102 prepares an identification certificate 210 to identify the user, in response to the long term security policy 200 and the user request input at 107. The identification certificate 210 includes, for example, the user name "JOHN", the security level "TOP SECRET", the expiration date of the security level "Dec. 31, 1997", the freshness constraint period "20 MINUTES", the user's public key "ABC123", and the address of the revocation authority "SERVER 106". The identification certificate 210 also includes a digital signature 211 that uniquely identifies the identification authority server computer 102 as the source of the certificate 210 and also provides for verifying the integrity of the contents of the certificate 210. (For brevity, we assume that computer 140 has the key to verify the signature on certificate 210.) The identification certificate 210 is sent to the user's computer 130. The identification certificate 210 can also be sent to the network storage 116.

The security policy server of computer 104 of FIG. 2A prepares a short term policy message 202 that it sends to computer 106. The revocation authority server of computer 106 prepares a time stamped validity certificate 215, which is updated at specified intervals. The validity certificate 215 certifies at the stated instant, the security status of a particular user and of a particular identification certificate 210 of that user. Changes in the security status stated in the validity certificates 215 are made by the revocation authority server computer 106 in response to updates in the short term security policy 202. The validity certificate 215 includes the time stamp "Mar. 12, 1997 @ 0930" for example, the user's identity and the identity of the corresponding identification certificate "JOHN (211)", and the current security status "OK". The validity certificate 215 also includes a digital signature that uniquely identifies the revocation authority server computer 106 as the source of the validity certificate 215 and also provides a for verifying the integrity of the contents of the validity certificate 215. The validity certificate 215 is sent to the network storage 116, to be available to nodes in the public network 100 that need to know the current security status of the user.

Figure 2B:
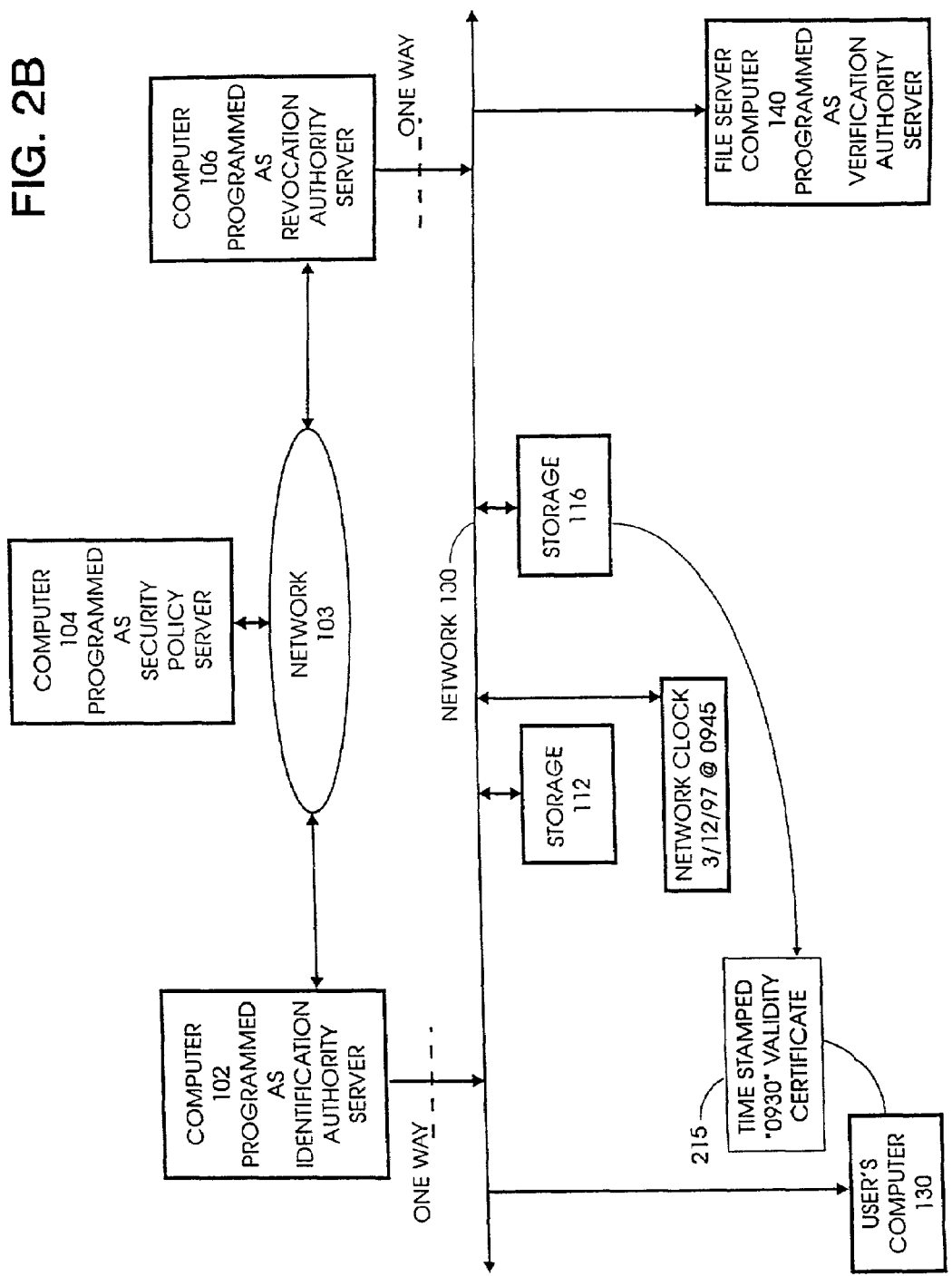
FIG. 2B is an architectural diagram showing the example of the implementation of an embodiment of the invention in the prior art computer network of FIG. 1, when the network clock is "Mar. 12, 1997 @ 0945".

FIG. 2B is an architectural diagram showing the example of the implementation of an embodiment of the invention in the prior art computer network of FIG. 1, when the network clock is "Mar. 12, 1997 @ 0945". When the user at computer 130 wants to access a file from the file server computer 140, the user requests a copy of the most recent validity certificate 215 from the network storage 116. The time stamped validity certificate 215 returned to the user bears a time stamp of "Mar. 12, 1997 @ 0930".

FIG. 2C is an architectural diagram showing the example of the implementation of an embodiment of the invention in the prior art computer network of FIG. 1, when the network clock is "Mar. 12, 1997 @ 1000". In this example, the revocation authority computer 106 provides an updated validity certificate 215' about the user at the time "Mar. 12, 1997 @ 1000" in response to the updated short term policy 202' input from the security policy server computer 104. The user's new status has changed to "NOT OK". The new validity certificate 215' includes the time stamp "Mar. 12, 1997 @ 1000" for example, the user's identity and the identity of the corresponding identification certificate "JOHN (211)", and the current security status "NOT OK". The updated validity certificate 215' is stored in the network storage 116.

Figure 2D:
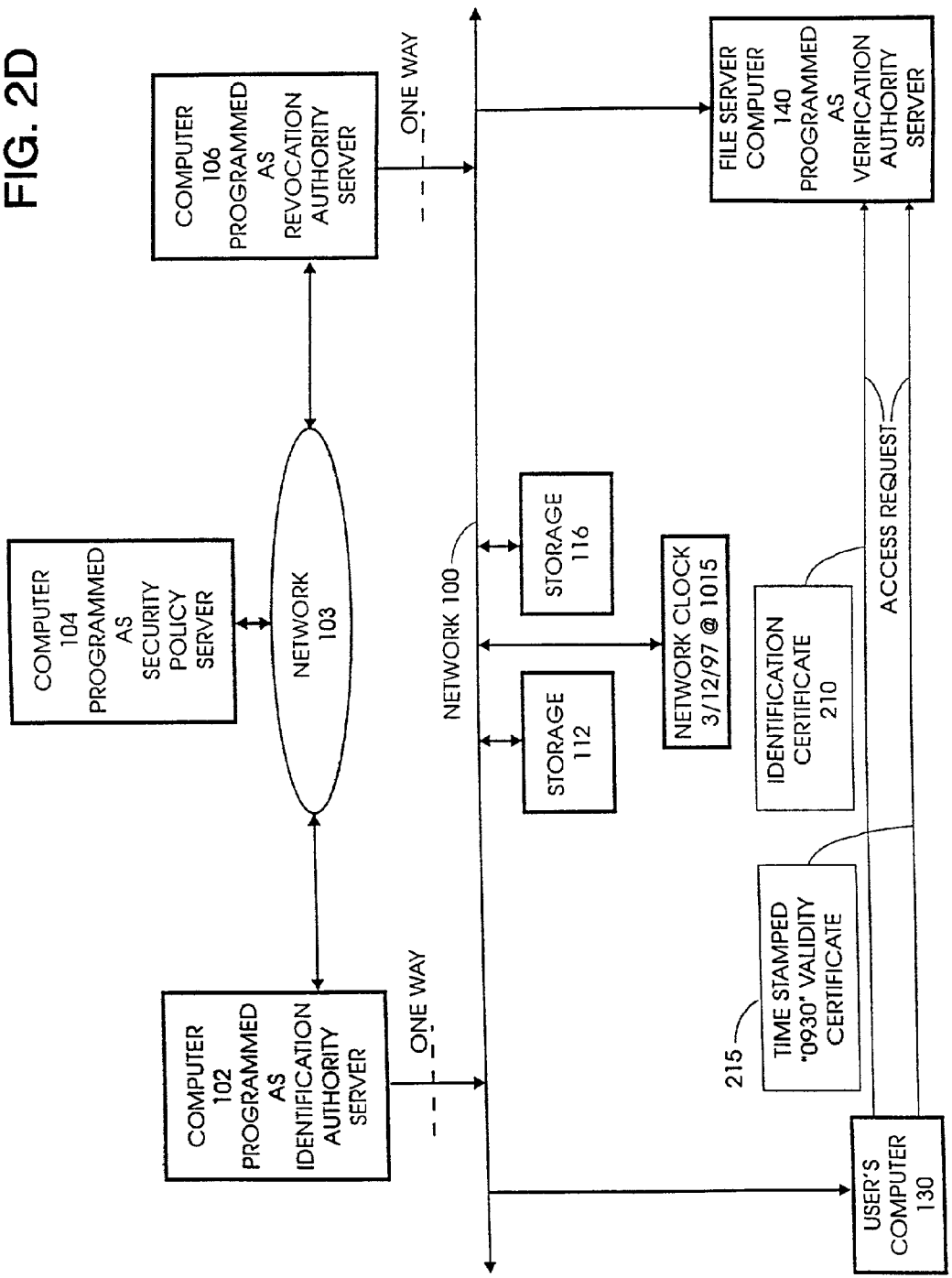
FIG. 2D is an architectural diagram showing the example of the implementation of an embodiment of the invention in the prior art computer network of FIG. 1, when the network clock is "Mar. 12, 1997 @ 1015".

FIG. 2D is an architectural diagram showing the example of the implementation of an embodiment of the invention in the prior art computer network of FIG. 1, when the network clock is "Mar. 12, 1997 @ 1015". At this time, the user's computer 130 begins its access request to the file server computer 140 programmed as a verification authority server. A copy of the user's identification certificate 210 and a copy of the first time stamped "0930" validity certificate 215 are sent to the file server computer 140 programmed as a verification authority server. The verification authority server programmed computer 140 examines the identification certificate 210 and determines that the freshness constraint period is "20 MINUTES". This means that the time stamp of the validity certificate 215 sent by the user must not be older than 20 minutes before the current instant of "1015". Since the time stamp of the validity certificate 215 sent by the user is "0930", the first validity certificate 215 is too old. The verification authority server programmed computer 140 has several options in response to this. For example, it can request a copy of the latest validity certificate 215' from the network storage 116, as is shown in FIG. 2E. Or, alternately, it can require the user's computer 130 to request a copy of the latest validity certificate 215' from the network storage 116, as is shown in FIG. 3B.

FIG. 2E is an architectural diagram showing the example of the implementation of an embodiment of the invention in the prior art computer network of FIG. 1, when the network clock is "Mar. 12, 1997 @ 1016". The verification authority server programmed computer 140 requests a copy of the latest validity certificate 215' from the network storage 116, which has a time stamp of "Mar. 12, 1997 @ 1000". The user's new status has changed to "NOT OK". The new validity certificate 215' includes the time stamp "Mar. 12, 1997 @ 1000", the user's identity and the identity of the corresponding identification certificate "JOHN (211)", and the current security status "NOT OK".

Figure 2F:
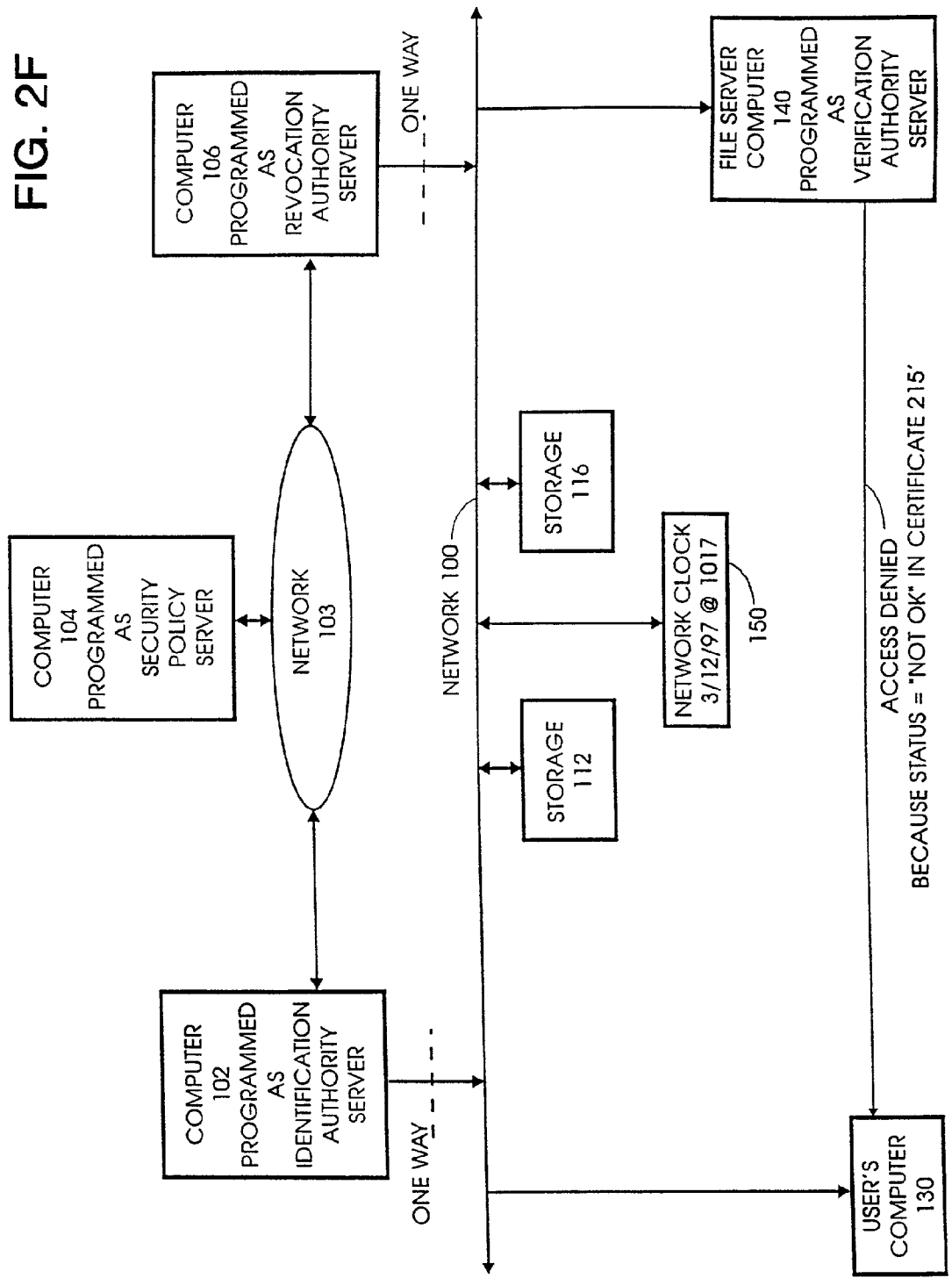
FIG. 2F is an architectural diagram showing the example of the implementation of an embodiment of the invention in the prior art computer network of FIG. 1, when the network clock is "Mar. 12, 1997 @ 1017".

FIG. 2F is an architectural diagram showing the example of the implementation of an embodiment of the invention in the prior art computer network of FIG. 1, when the network clock is "Mar. 12, 1997 @ 1017". The verification authority server programmed computer 140 denies the user's access request because the new status is "NOT OK" in the certificate 215'.

FIG. 2G is an architectural diagram showing an example of the implementation of a modified embodiment of the invention in the prior art computer network of FIG. 1, at the same stage as in FIG. 2D when the network clock is "Mar. 12, 1997 @ 1015".

FIG. 2H is an architectural diagram showing the example of the implementation of the modified embodiment of the invention in the prior art computer network of FIG. 1, at the stage following FIG. 2G, when the network clock is "Mar. 12, 1997 @ 1016". In this example the verification authority server programmed computer 140 denies the user's access request because certificate 215 is too old for the freshness constraint period. The verification authority server programmed computer 140 requires the user's computer 130 to request a copy of the latest (or an adequately recent) validity certificate 215' from the network storage 116, and to then forward it to the computer 140.

FIG. 1A is an architectural diagram of another prior art computer network within which the invention can be applied. The prior art computer network of FIG. 1A differs from the prior art computer network of FIG. 1 in that it adds an additional computer 108 that is connected to the private network 103 and to the public network 100. Computer 102 is not connected to network 103 and computer 106 is not connected to network 103. Computer 104 has a direct connection to computer 102 through input 107 and computer 104 has a direct connection to computer 106 through input 101.

Figure 3A:
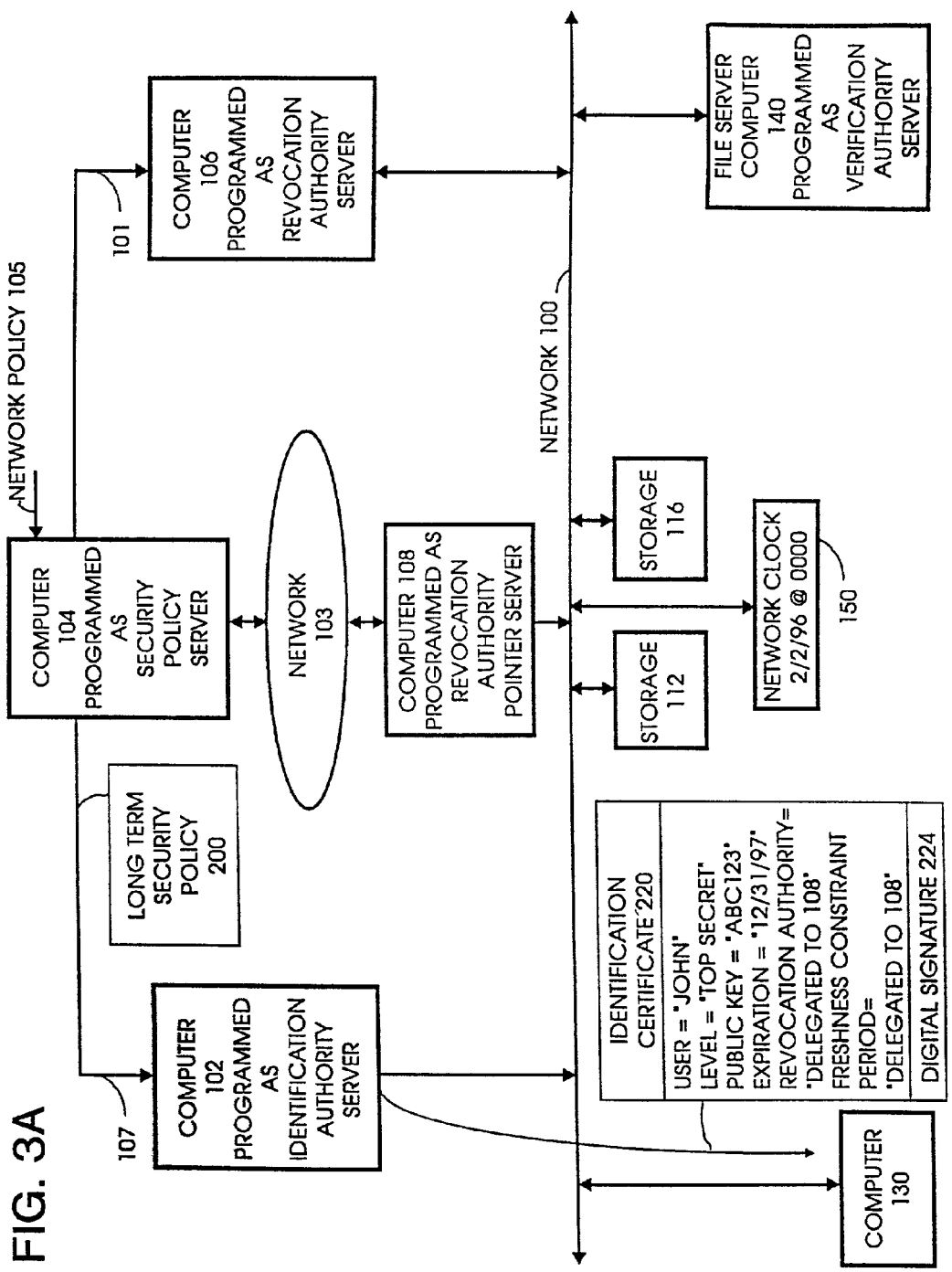
FIG. 3A is an architectural diagram showing an example of the implementation of a second embodiment of the invention in the prior art computer network of FIG. 1A, showing identification authority server computer 102 issuing identification certificate 220 when the network clock is "Feb. 2, 1996 @ 0000".
Figure 3B:
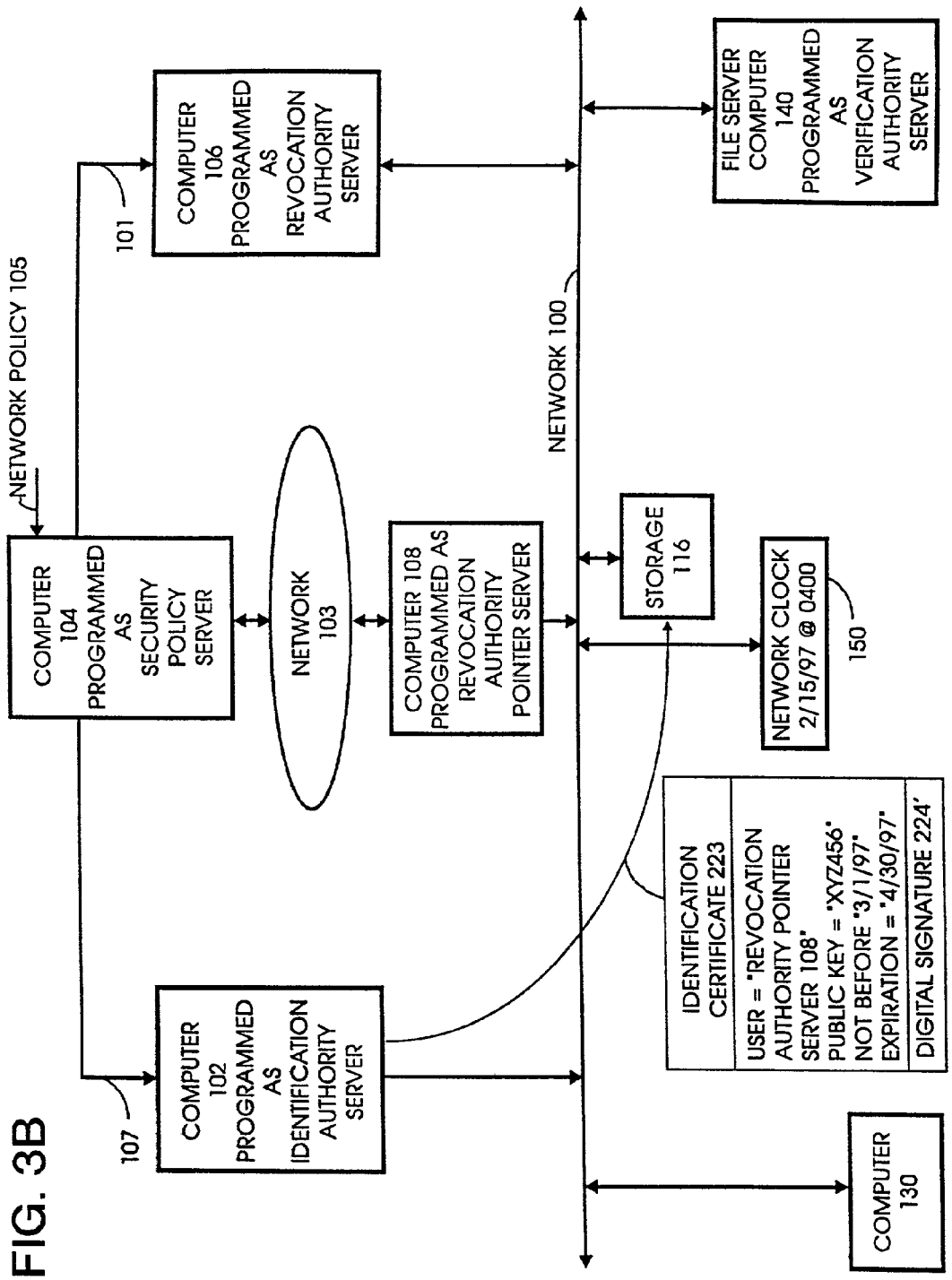
FIG. 3B is an architectural diagram showing the example of the implementation of the second embodiment of the invention in the prior art computer network of FIG. 1A, showing identification authority server computer 102 issuing the identification certificate 223 when the network clock is "Feb. 15, 1997 @ 0400".

FIG. 3A is an architectural diagram showing an example of the implementation of a second embodiment of the invention in the prior art computer network of FIG. 1A, showing identification authority server computer 102 issuing identification certificate 220 when the network clock is "Feb. 2, 1996 @ 0000". The identification certificate 220 is issued in response to the long term security policy 200 output from the security policy server computer 104 over direct connection 107 to computer 102, which is in response to the network security policy 105. The second embodiment of the invention adds the feature of delegation of authority by using a delegation certificate. This feature is useful, for example, when it is anticipated that changes may need to be made in the types of authorizations specified in the long term identification certificate 210 of FIG. 2A. For example, the long term identification certificate 210 of FIG. 2A specifies the identity of the revocation authority as "server 106". However, the network security policy 105 may want to change the designation of the revocation authority and/or freshness constraint period before the end of the long term. In the first embodiment of FIG. 2A, this would require the identification authority server computer 102 to issue a revised identification certificate 210 or to defer the specification of the revocation authority and/or freshness constraint period and the specification of these in a second, shorter term certificate. Instead, the second embodiment of the invention of FIG. 3A provides for delegating the designation of the revocation authority to the revocation authority pointer computer 108. The identification certificate 220 of FIG. 3A sent from the identification authority server computer 102 to the user computer 130, specifies the revocation authority as="Delegated to 108". In another example, the long term identification certificate 210 of FIG. 2A specifies the freshness constraint as a period="20 Minutes". However, the network security policy 105 may want to change the designation of the freshness constraint before the end of the long term. Instead of requiring the identification authority server computer 102 to issue a revised identification certificate 210, the second embodiment of the invention of FIG. 3A provides for delegating the designation of the freshness constraint to the revocation authority pointer computer 108. Identification certificate 220 of FIG. 3A specifies the freshness constraint period as="Delegated to 108". The identification certificate 220 also includes a digital signature 224 that uniquely identifies the identification authority server computer 102 as the source of the certificate 220 and also provides for verifying the integrity of the contents of the certificate 220. (For brevity, we assume that computer 140 has the key to verify the signature on certificate 220.) The identification certificate 220 is sent to the user's computer 130. The identification certificate 220 can also be sent to the network storage 116.

FIG. 3B is an architectural diagram showing the example of the implementation of the second embodiment of the invention in the prior art computer network of FIG. 1A, showing identification authority server computer 102 issuing the identification certificate 223 when the network clock is "Feb. 15, 1997 @ 0400". The second identification certificate 223 provides the public key="XYZ456" of the revocation authority pointer server computer 108. This public key is used to verify the digital signature 231 of the medium-term delegation certificate 230 issued by computer 108 in FIG. 3C. This second identification certificate 223 of FIG. 3B also includes a medium term duration specification of its validity, from not before "Mar. 1, 1997" until it expires on "Apr. 30, 1997". The certificate 223 can be stored on the network storage 116 so as to be accessible by the nodes in public network 100. The certificate 223 can be automatically issued on a periodic basis, such as once every two months, to enable verifying the digital signature in the medium-term delegation certificate 230 issued by computer 108 in FIG. 3C. If the public key does not change from one period to the next, the new certificate indicates that the public key is still valid for the next time period.

FIG. 3C is an architectural diagram showing the example of the implementation of the second embodiment of the invention in the prior art computer network of FIG. 1A, showing revocation authority pointer computer 108 issuing medium-term delegation certificate 230 when the network clock is "Mar. 8, 1997 @ 1100". The medium-term delegation certificate 230 is issued in response to the medium term security policy 201 output from the security policy server computer 104, which is in response to the network security policy 105. The certificate 230 can be automatically issued on a periodic basis, such as once every week, until the policy 105 is changed. The medium-term delegation certificate 230 of FIG. 3C references "all users with level=top secret." The second embodiment of the invention provides for delegating the designation of the revocation authority (but not freshness constraint period) to the revocation authority computer 106. The medium-term delegation certificate 230 of FIG. 3C specifies the revocation authority as="Server 106". In accordance with the invention, this designation can be changed using revocation authority pointer server computer 108, without requiring the identification authority server computer 102 to issue a revised identification certificate 220. Also, the second embodiment of the invention provides for delegating the designation of the freshness constraint to the revocation authority pointer computer 108. The medium-term delegation certificate 230 of FIG. 3C specifies the freshness constraint period as="20 Minutes". In accordance with the invention, this designation can be changed without requiring the identification authority server 102 to issue a revised identification certificate 220. The medium-term delegation certificate 230 of FIG. 3C also includes the medium term duration of its validity, from not before "Mar. 10, 1997" until it expires on "Mar. 17, 1997". The medium-term delegation certificate 230 also includes a digital signature 231 that uniquely identifies the revocation authority pointer server computer 108 as the source of the medium-term delegation certificate 230 and also provides for verifying the integrity of the contents of the certificate 230. The medium-term delegation certificate 230 is sent to the network storage 116.

Figure 3D:
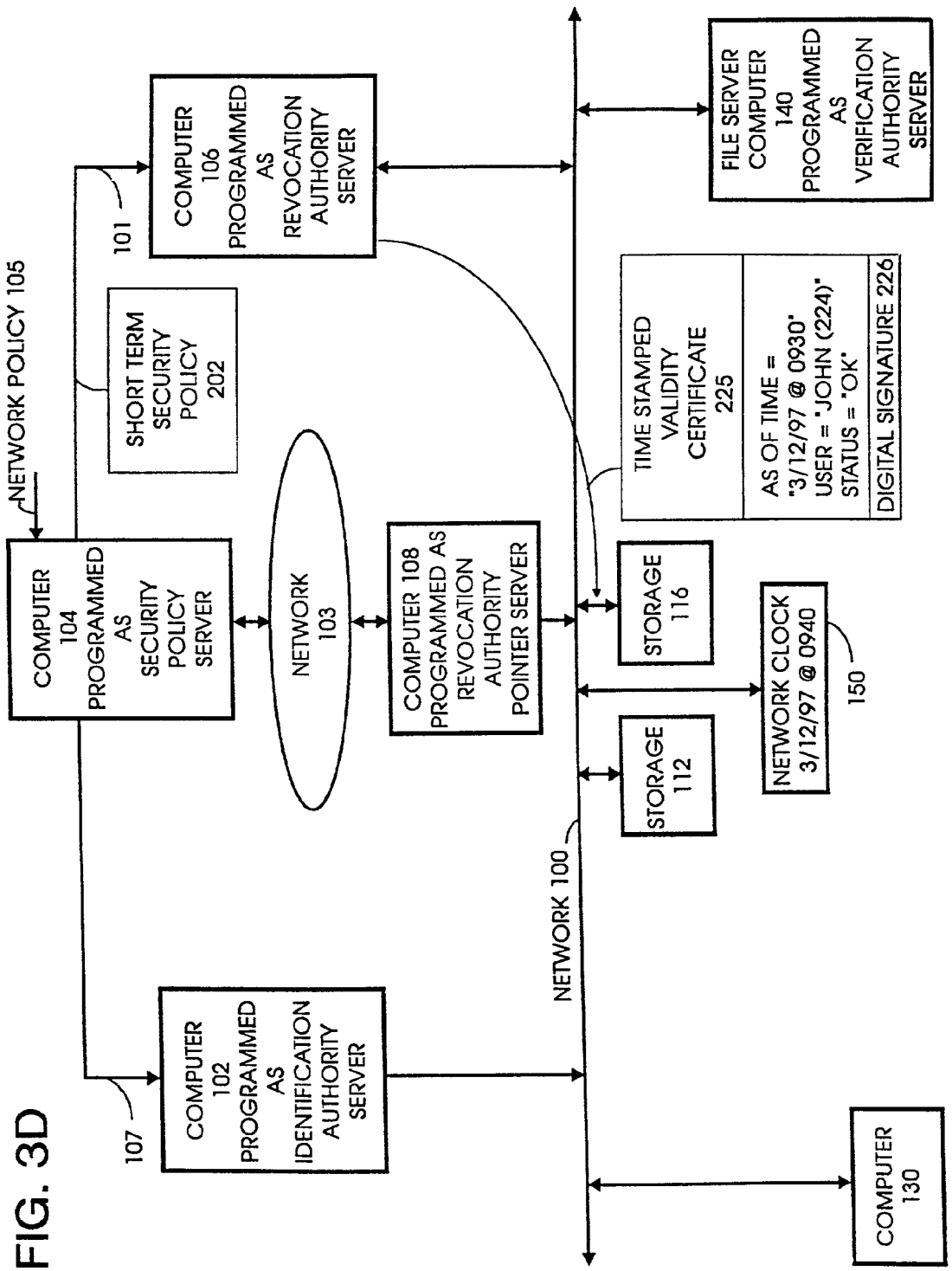
FIG. 3D is an architectural diagram showing the example of the implementation of the second embodiment of the invention in the prior art computer network of FIG. 1A, showing revocation authority server computer 106 issuing the time stamped validity certificate 225 when the network clock is "Mar. 12, 1997 @ 0940".

FIG. 3D is an architectural diagram showing the example of the implementation of the second embodiment of the invention in the prior art computer network of FIG. 1A, showing revocation authority server computer 106 issuing the time stamped validity certificate 225 when the network clock is "Mar. 12, 1997 @ 0940". The time stamped validity certificate 225 is issued in response to the short term security policy 202 output from the security policy server computer 104 over line 101 to computer 106, which is in response to the network security policy 105. The short term security policy 202 may authorize the continued issuance of time stamped validity certificates 225 with a status="OK" until policy 202 is preempted by a subsequent short term security policy that changes that status. The revocation authority server of computer 106 prepares the time stamped validity certificate 225, which is updated at specified intervals or on demand from requesting nodes in the network 100. The validity certificate 225 certifies at the stated instant, the security status of a particular user and of a particular identification certificate 220 of that user. The validity certificate 225 can reference multiple identification certificates 220 of that user. Changes in the security status stated in the validity certificates 225 are made by the revocation authority server computer 106 in response to updates in the short term security policy 202. The validity certificate 225 includes the time stamp "Mar. 12, 1997 @ 0930" for example, the user's identity and the identity of the corresponding identification certificate "JOHN (224)", and the current security status "OK". The validity certificate 225 also includes a digital signature 226 that uniquely identifies the revocation authority server computer 106 as the source of the validity certificate 225 and also provides for verifying the integrity of the contents of the validity certificate 225. The validity certificate 225 is sent to the network storage 116, to be available to nodes in the public network 100 that need to know the current security status of the user.

Figure 3E:
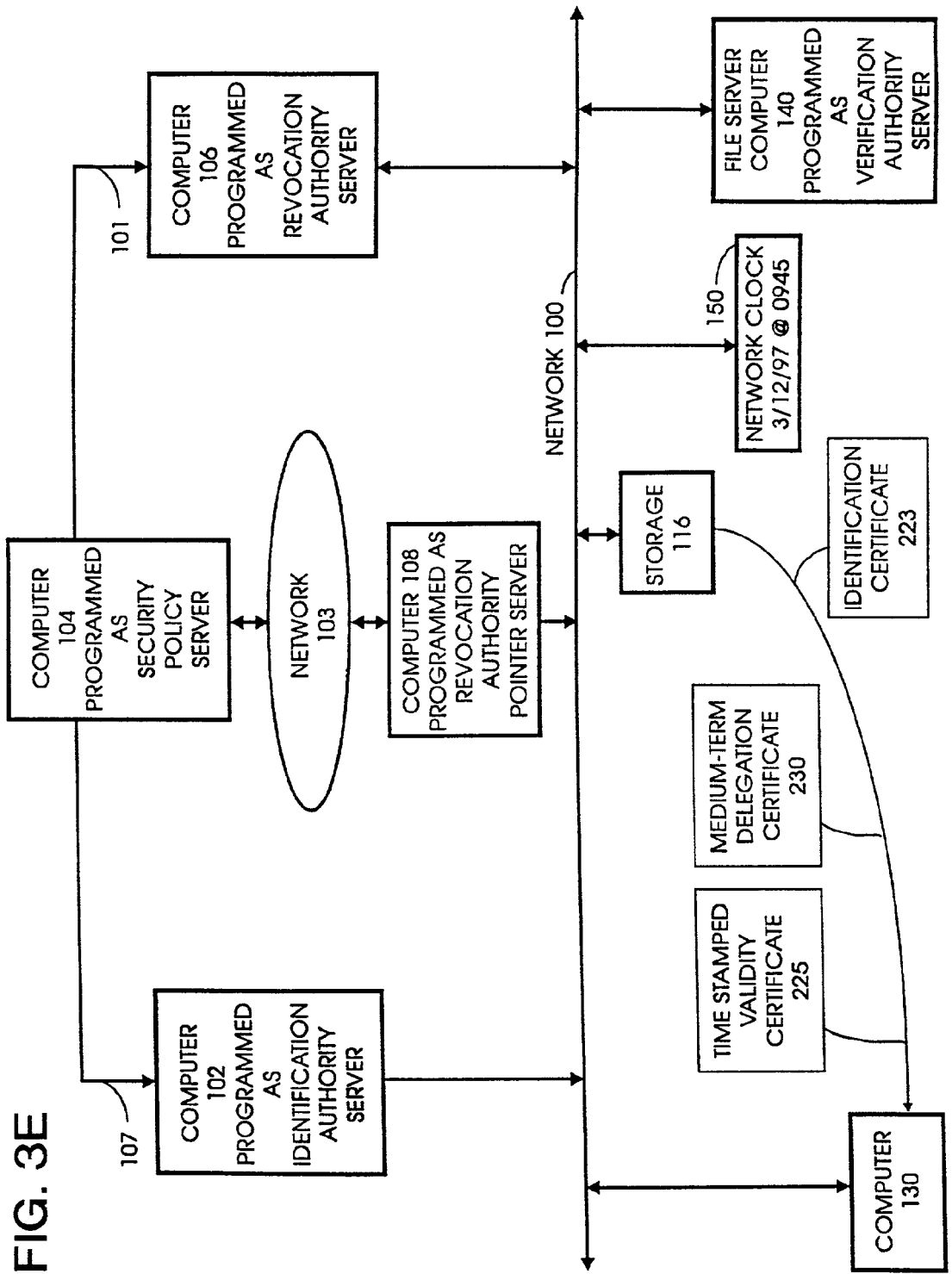
FIG. 3E is an architectural diagram showing the example of the implementation of the second embodiment of the invention in the prior art computer network of FIG. 1A, showing user computer 130 accessing certificates 223, 225, and 230 from network storage 116 in preparation for making an access to the file server 140 when the network clock is "Mar. 12, 1997 @ 0945".

FIG. 3E is an architectural diagram showing the example of the implementation of the second embodiment of the invention in the prior art computer network of FIG. 1A, showing user computer 130 accessing certificates 223, 225, and 230 from network storage 116 in preparation for making an access request to the file server 140, when the network clock is "Mar. 12, 1997 @ 0945".

Figure 3F:
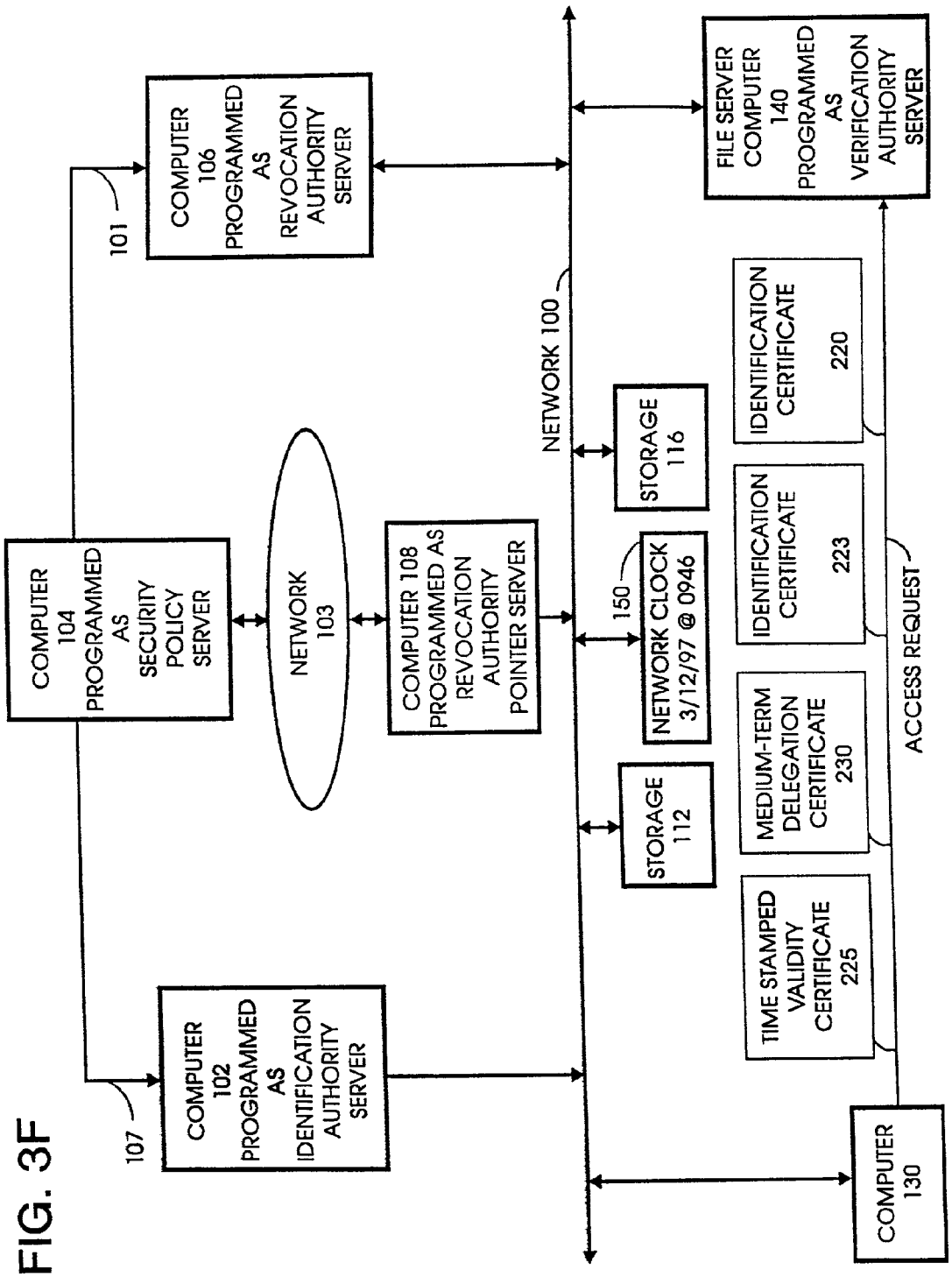
FIG. 3F is an architectural diagram showing the example of the implementation of the second embodiment of the invention in the prior art computer network of FIG. 1A, showing the user computer making an access request to the file server 140 when the network clock is "Mar. 12, 1997 @ 0946".

FIG. 3F is an architectural diagram showing the example of the implementation of the second embodiment of the invention in the prior art computer network of FIG. 1A, showing the user computer making an access request to the file server 140 when the network clock is "Mar. 12, 1997 @ 0946". The user computer 130 sends identification certificates 220 and 223, medium-term delegation certificate 230, and time stamped validity certificate 225 to the file server computer 140. The file server computer 140 is programmed, in accordance with the invention, as a verification authority server. In the verification of these certificates, computer 140 verifies that all "not before" and expiration time constraints are satisfied at the instant of verification of "Mar. 12, 1997 @ 0946" in FIG. 3F. The verification authority server programmed computer 140 examines the identification certificate 220 and uses the public key of computer 102 to verify and determine that the designation of the freshness constraint period and revocation authority has been delegated to the revocation authority pointer server 108. The verification authority server programmed computer 140 verifies the signature of identification certificate 223 using the public key of computer 102 and extracts the public key "XYZ456" from the identification certificate 223. The verification authority server programmed computer 140 uses the public key "XYZ456" from the identification certificate 223 to verify the digital signature 231 of the medium-term delegation certificate 230 issued by server 108. The verification authority server programmed computer 140 examines the medium-term delegation certificate 230 issued by server 108 and determines that the designation of the freshness constraint period is "20 MINUTES". This means that the time stamp of the validity certificate 225 sent by the user must not be older than 20 minutes before the current instant of Mar. 12, 1997 @ 0946. The verification authority server programmed computer 140 examines the medium-term delegation certificate 230 issued by server 108 and determines that the designation of the revocation authority is="server 106". The verification authority server programmed computer 140 examines the time stamped validity certificate 225 issued by revocation authority server computer 106 and determines that the time stamp="Mar. 12, 1997 @ 0930" satisfies the freshness constraint that it is not older than 20 minutes before the current instant of Mar. 12, 1997 @ 0946.

Figure 3G:
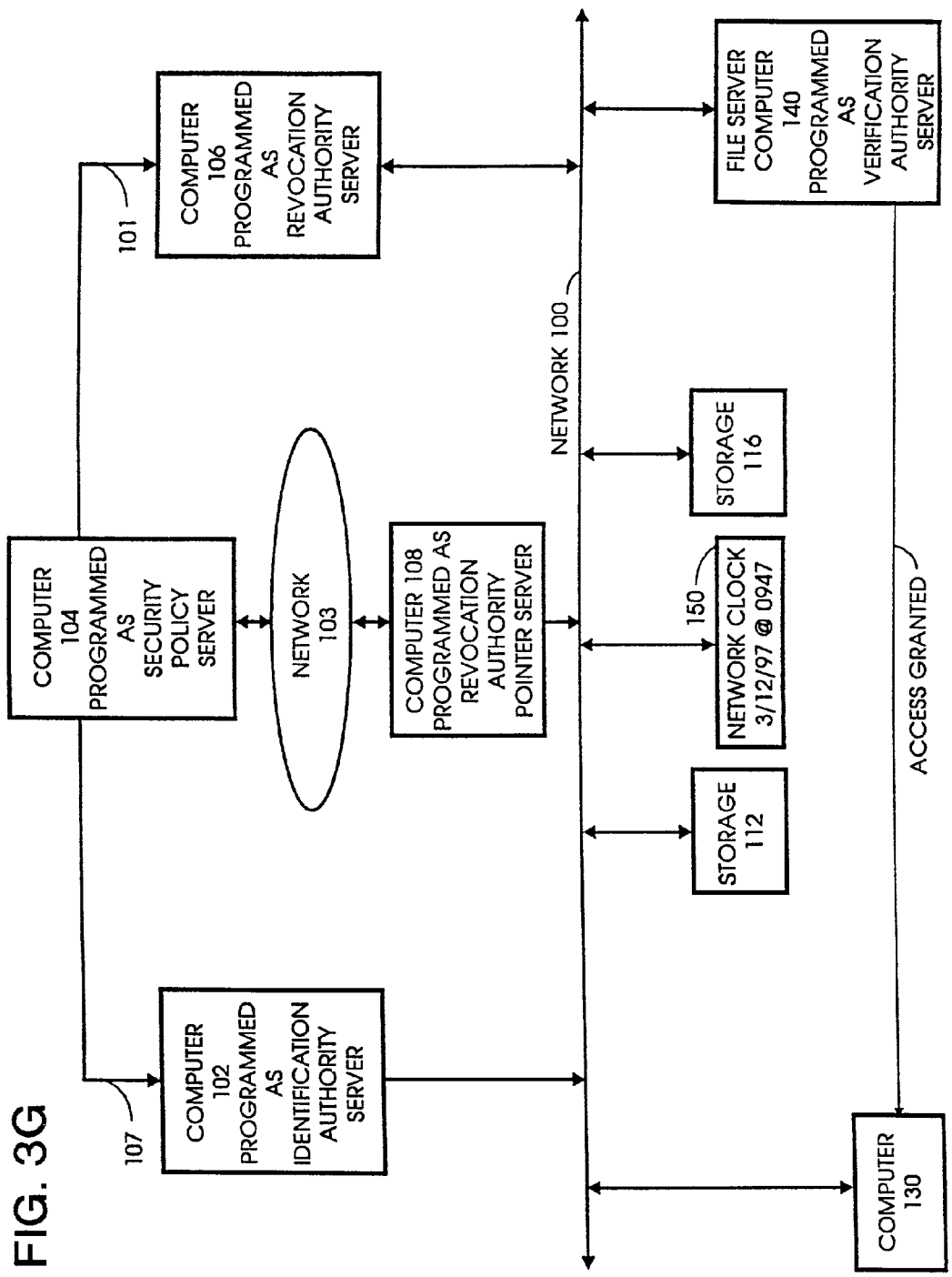
FIG. 3G is an architectural diagram showing an example of the implementation of the second embodiment of the invention in the prior art computer network of FIG. 1A, showing the verification authority server of the file server computer 140 granting the access request of the user computer 130 when the network clock is "Mar. 12, 1997 @ 0947".

FIG. 3G is an architectural diagram showing an example of the implementation of the second embodiment of the invention in the prior art computer network of FIG. 1A, showing the verification authority server of the file server computer 140 granting the access request of the user computer 130 when the network clock is "Mar. 12, 1997 @ 0947".

Figure 4A:
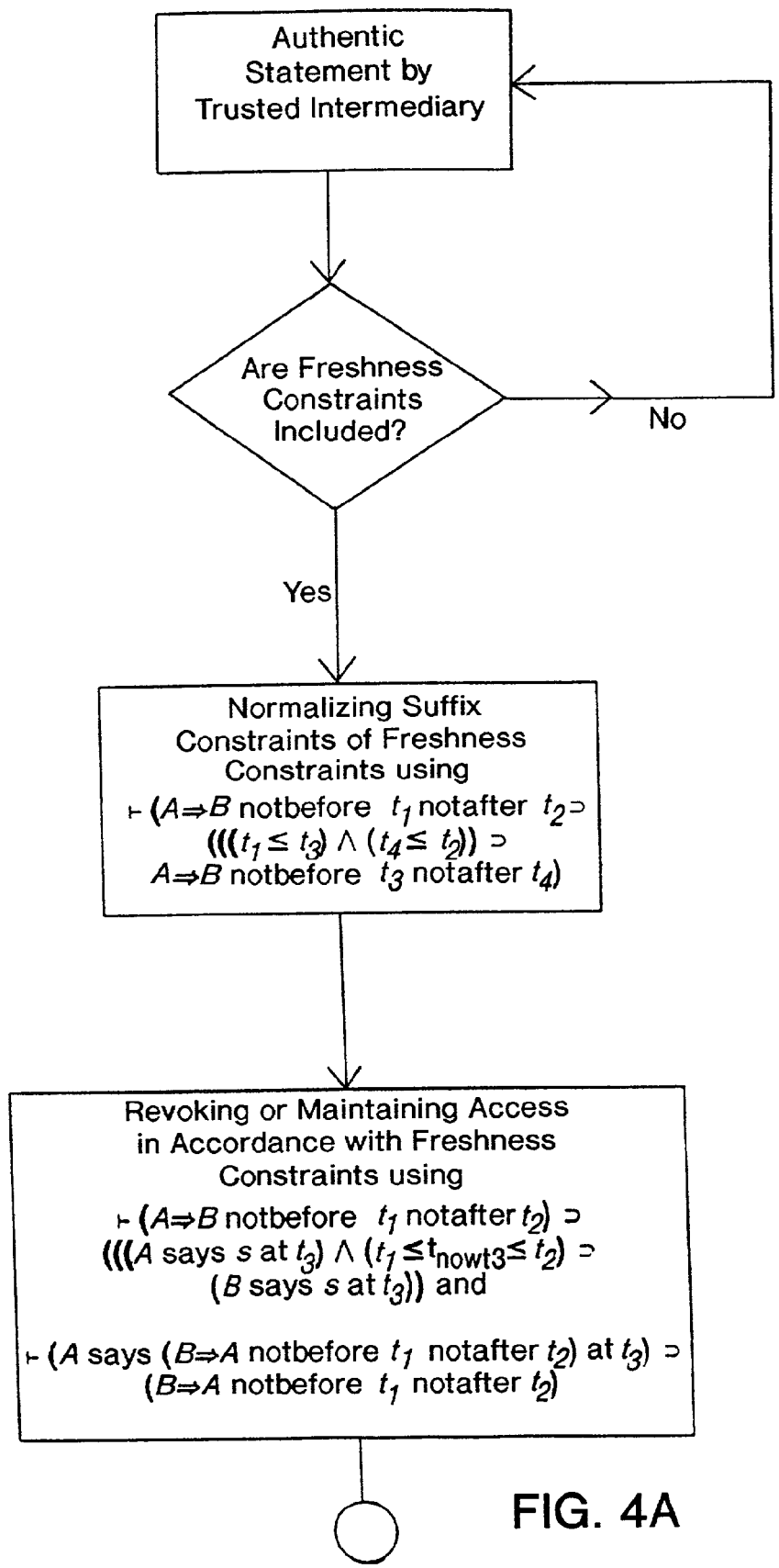
FIG. 4A is a flow chart explaining the present invention using axioms.

FIG. 4A is a flow chart explaining the present invention using axioms. First an authentic statement is made. The statement is made, for example, by a trusted intermediary. It is then determined whether freshness constraints are included in the authentic statement. If so, suffix constraints of the freshness constraints are normalized using statement (P6). Then, access is maintained or revoked in accordance with the freshness constraints using statements (P7) and (P8).

Now, recent-secure authentication and bounds on revocation specified as freshness constraints on statements made by entrusted entities will be explained. The recent-secure authentication will be discussed with respect to Kerberos as an example, but is not limited to a Kerberos system.

To effect revocation, authenticating entities are assumed to contain freshness constraints as set forth above, which they follow. These constraints can come from the authentication entity's participation in a distributed system. For example, a vendor conducting electronic commerce on a public network authenticates customers according to the policies of organizations taking financial liability for the transaction. Authenticating entities are given a set of credentials or statements for channel authentication. They also begin with a set of freshness constraints that embody, in part, the revocation policies. Revocation policies are also embodied in freshness constraints recommended by intermediary certifiers. That is, Definition $A \Rightarrow B$ satisfies freshness constraint $\delta_A \Rightarrow_B$ at time $t_{now}$ iff $A \Rightarrow B$ notbefore $t$ where $(t_{now} - \delta_{A \Rightarrow B}) \leq t$ and $\delta_{A \Rightarrow B} \leq t_{now}$.

This defines a time constraint such as one hour, etc. Verification policies can be interpreted as constraints on axiomatic derivations in a number of ways. For example, freshness constraints can be applied to ⇒relations during interpretation by replacing existing less restrictive "notbefore" qualifiers with more restrictive freshness constraints in appropriate "speaksfor" (sub)statements. This implies that the interpretation of messages of the specification may change due to the interpretation of verification policies. For example, if the freshness constraint $\delta_{CA \Rightarrow CA/Bob} = 30$ minutes is assumed by the authenticating entity, and CA ⋅CA/Bob is given, then CA ⋅OA/Bob might be replaced with the following which is more restrictive:

CA ⋅CA/Bob notbefore($t_{now}$ −30 minutes).

This means that the authenticating certificate statement must be received every 30 minutes. Channels obeying freshness constraints are called recent-secure channels and are defined as follows:

Definition A ⋅B is recent-secure at time $t_{now}$ iff A ⋅B can be deduced from given statements with freshness constraints applied.

It follows from the above definitions that if freshness constraints are associated with each trusted certifier whose statements may be used to establish a channel, then the delay for revocation can be bounded by the least restrictive freshness constraint. Consequently, the choice of freshness constraints can arbitrarily bound the delay for revocation. Certifiers recommend freshness constraints typically by imposing "notafter" times in certificates. However, freshness policies can be promulgated in varying types of certificates from whoever is specified as an authority as will be explained later. In addition, the authority for the policies can change depending on the nature of the transaction.

Kerberos is designed to enable application servers to impose freshness constraints on users who initially log-in using shared keys. To do this, the time of initial log-in "authtime" is carried in a ticket that is presented to the application server. Application servers can choose to reject the credentials if the "authtime" is not recent even if the ticket is still within its valid lifetime.

A recent proposal calls for public key extensions for initial authentication. With the exception of public-key authentication during initial log-in, all protocols remain the same. The implication of recent-secure authentication is that application servers need to know that their recent-secure authentication policies are satisfied. In the present invention, verifiers are employed to determine what policies need to be satisfied.

With the addition of public-key authentication to Kerberos, the current "authtime" field may not be sufficient for application servers to determine if initial authentication satisfies their authentication policies. The problem is complicated by the fact that recent-secure authentication policies may vary for each server, and possibly for each particular type of transaction. One approach to make Kerberos "recent-secure friendly" is to require users to satisfy prescribed recent-secure authentication policies prior to obtaining a ticket. During the course of a session, the application server may require the user to satisfy new policies or simply maintain freshness policies during a long session (e.g., refresh stale certificates). A new ticket can be issued once recent-secure authentication is satisfied.

Additionally, a revocation service should have the properties of being definite, available and recent, contained, adjustable and having bounded recovery.

Since large distributed systems have emerged, there has been a need for improving the joint authority technique (i.e., improving the technique of using a separate identification authority and revocation authority) for building a highly available and secure revocation service. The revocation service of the present invention uses identification authorities for issuing long-lived identification certificates and revocation authorities for issuing time stamped certificates. The time stamped certificates are stamped at date of issue (i.e., at the time when an entity became valid) do not require expiration dates. The identification authorities retain control of the specification of revocation certificates. Information about the freshness of revocation certificates is made explicit. That is, freshness constraints are determined from the time interval of verification.

The identification authority and the revocation authority have only unidirectional communication to the network. However, this approach can be complemented, particularly when revocation certificates must be extremely fresh and propagation delays in any conceivable directory are too slow. One approach is to use an on-line secret-sharing scheme having low latency and highly reliable communication between the secret-sharing sewers. When authenticating entities are able to access the central service they can obtain fresh revocation certificates. A mechanism is needed for posting updates to the revocation service. This can include.

The identification authority specifies freshness constraints for revocation within the identification certificates. That is, in addition to conventional key and name binding the revocation authority specifies the restriction that revocation certificates obtained from the revocation authority meet designated freshness constraints. The significance of specifying freshness constraints in the identification certificates, delegating revocation authority, and issuing time stamped revocation certificates are as follows. Again, it should be noted that the freshness constraints can be specified in any type of certificate by any type of authority, not just by an identification authority and not in just an identification certificate.

The revocation authority need not be trusted to assign correct lifetimes to short-term revocation certificates. Otherwise, even after the compromised revocation authority is discovered, these certificates might still be used. In addition, clients need not interact with trusted on-line servers containing keys. It is preferable that they do not since this would compromise security. That is, high availability relies on data replication using untrusted servers instead of replicating trusted processes. The service is also secure because both identification and revocation authorities have unidirectional communication to the network.

Using time stamped revocation certificates instead of certificates with explicit expiration times scales better since the same time stamped certificates can be used by any authenticating entity and can be used for multiple freshness policies. Finally, availability is possible assuming the use of directories. Therefore, revocation according to the present invention requires less trust, is secure, is scalable and is highly available.

Figure 4B:
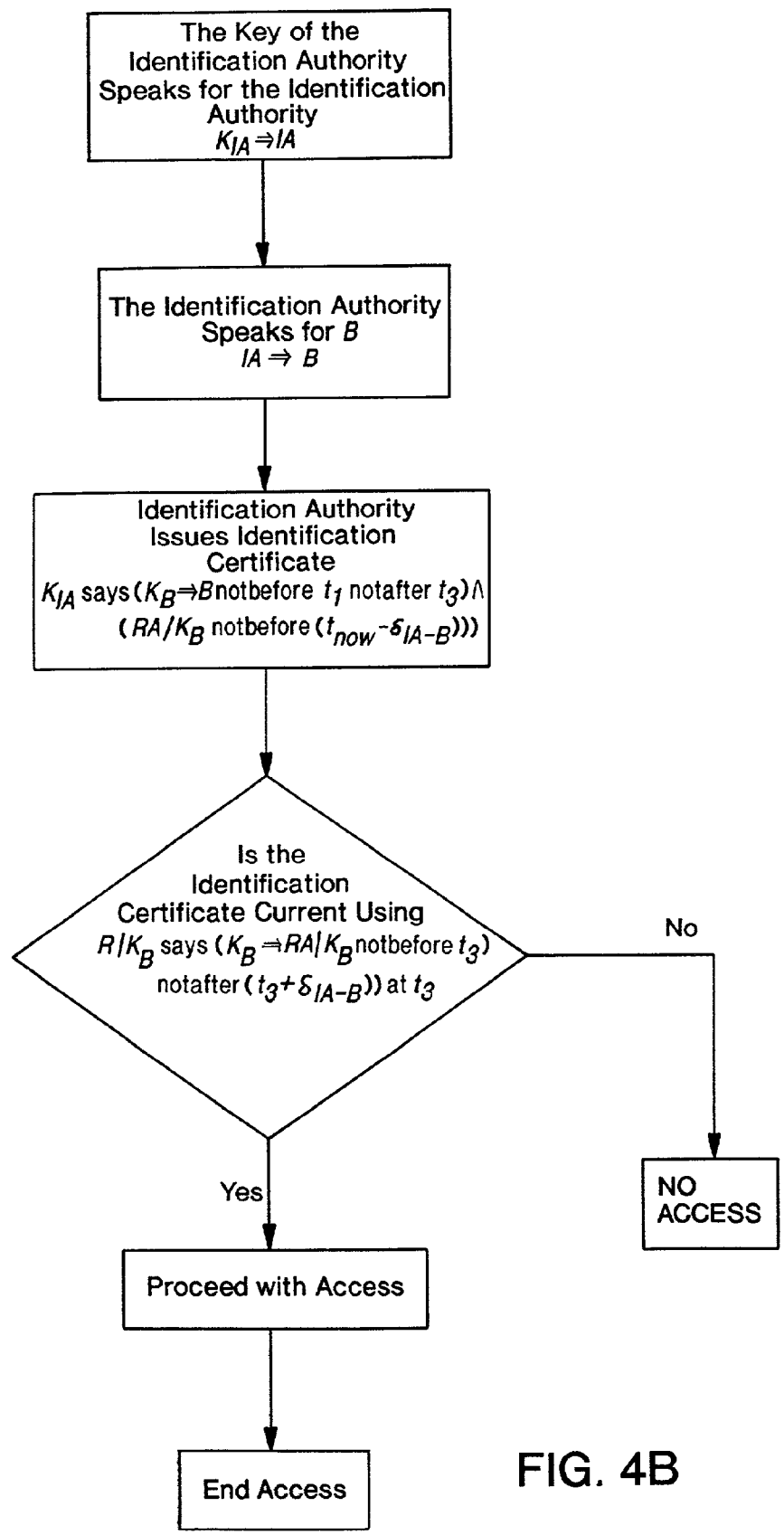
FIG. 4B is a flow chart explaining the present invention using policy constraints and assumptions of the revocation service according to the present invention.

The statements of the revocation service will now be described with respect to policy constraints and assumptions as follows, and as set forth in the flow chart in FIG. 4B.

Entities who want to establish a channel, for example, B, require a secure channel with an identification authority IA. The entity must trust that IA has the authority to issue a certificate to B. This is established as follows.

$$K_{IA} \Rightarrow IA \quad (1)$$

That is, the key for the identification authority $K_{IA}$ speaks for the identification authority IA. Therefore, $$IA \Rightarrow B \quad (2)$$

That is, the identification authority IA speaks for B.

Then the off-line identification authority issues the following certificate.

$$K_{IA} \text{ says}((K_B \Rightarrow B \text{ notbefore } t_1 \text{ notafter } t_2) \wedge (RA|K_B$$
$$\Rightarrow B \text{ notbefore}(t_{now} - \delta_{IA} \bullet_B)) \quad (3)$$

where $K_B$ is the key for B, RA is the revocation authority and $\delta_{IA} \bullet_B$ is a recent-secure policy.

This statement has several important features. First, the expiration time of the certificate for B is long lived. Second, IA imposes its recent-secure policy, $\delta_{IA} \bullet_B$ on B using the constraint, $RA/K_B \bullet B$ notbefore $(t_{now} - \delta_{IA} \bullet_B)$. This means that for $K_B$ to be valid, claims made by $RA/K_B$ must be interpreted according to U's freshness policy stated in this certificate.

The revocation authority RA states that the identification certificate is current.

$$R/K_B \text{ says}(K_B \bullet RA/K_B \text{ notbefore } t_3 \text{ notafter}(t_3 + \delta_{IA}$$
$$\bullet_B))\text{at } t_3. \quad (4)$$

If the identification certificate is not current, i.e., the freshness constraint has expired, access is denied.

The particular value of $\delta_{IA} \bullet_B$ is not interpreted from the message corresponding to statement (4). Instead it is obtained from the original certificate statement (3).

It should be noted that more elaborate forms of joint authority might be useful. For example, using disjunction, the number of revocation authorities can be specified.

Figure 5A:
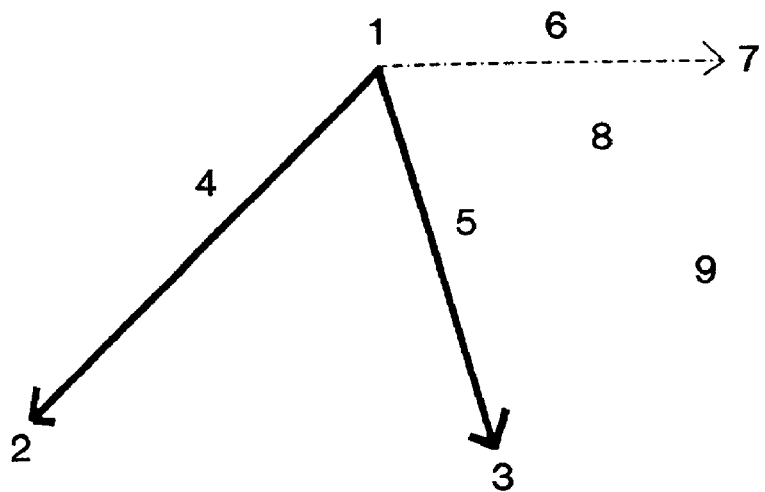
FIG. 5A is a diagram of a basic certificate topology according to the present invention.

The above statements of revocation service will now be applied to a particular example. A basic certificate topology will be now described and analyzed with respect to FIG. 5A. In FIG. 5A, identification certificates are indicated by directed arrows shown in bold and revocation certificates are indicated by directed arrows shown by light lines from the certificate authority to the entity designated in the certificate. A delegation certificate is indicated by a dashed bold arrow. The reference ① refers to a distinguished principal. The distinguished principal delegates initial assertions ④ and ⑤ to objects of the assertion ② and ③. The distinguished principal indicated by ① also delegates through an assertion ⑥, authority for validity of initial assertions to an object ⑦. The object ⑦ is an object of delegation authority for asserting a time stamp and a validity of initial assertions. The object ⑦ then delegates an assertion about the time stamp and validity of an initial assertion ⑨ and 10 to the objects of the assertion ② and ③.

Figure 5B:
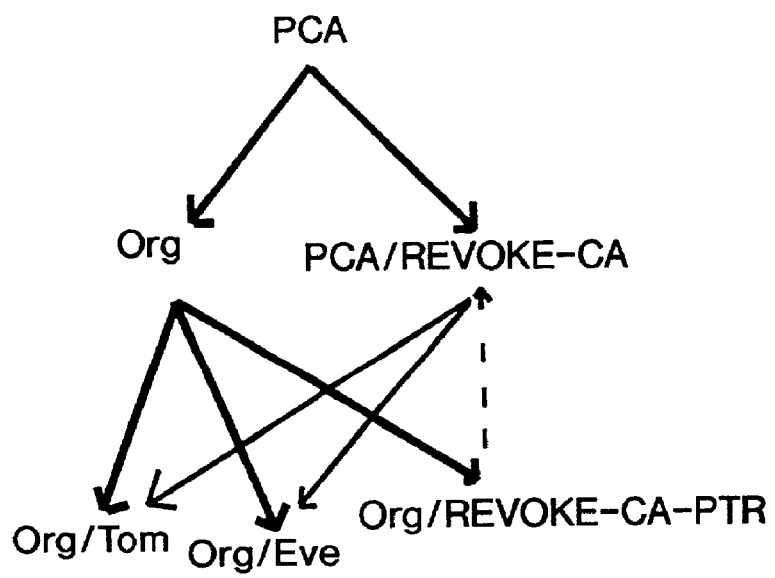
FIG. 5B is a diagram of a certificate topology according to a first embodiment of the present invention.

FIG. 5B is a certificate topology according to the present invention. A delegation certificate is indicated by a dashed bold arrow.

Policies for constraining the authorities of the principals can be expressed as initial statements which can be appropriately restrictive. For example, Org •Org/*, where •represents all identities. This can also be written as Org •Org/Eve.

Hence, one may not necessarily believe that Org •Org/Joe.

Additionally, constraints can be expressed as formulas by augmenting or revising the specification to express valid formulas using the syntax described above. For example, negation (¬) or conjunction (∧) can be used on formulas to express further restriction on the interpretation of messages.

Verification policies can also be enforced to modify the above-mentioned axioms. That is, the axioms can be further constrained by further constraining principals with particular principals. For example, the principal Eve can be replaced with Eve∧Bob or replace Eve with Bob quoting Eve, that is Bob/Eve. Similarly, "notbefore" and "notafter" qualifiers can be made more restrictive. Also, times of statements using "at" can be made more restrictive by specifying particular times.

The authenticating entity's goal is to authenticate that public key $K_{Org/Eve}$ can be used to establish a secure channel with a principal Org/Eve. That is, $$K_{Org/Eve} \bullet Org/Eve. \quad (1)$$

Then, for example, the "authenticating entity is required to obey the following freshness constraints:

$$\delta_{PCA} \bullet_{Org} = 31 \text{ days} \quad (2)$$

$$\delta_{Org} \bullet_{Org/Eve} = 30 \text{ minutes}. \quad (3)$$

The freshness constraints are dictated by the particular value of the transaction to be authenticated. Also, the authenticating entity obeys the constraints recommended by all trusted intermediaries. The time of authentication, for example, is:

$$t_{now} = 14:00 \text{ Jun. } 15, 1996 \quad (4)$$

Suppose that for a particular type of transaction the authenticating entity can only trust entities within a particular hierarchical security domain indicated by a top level policy certification authority (PCA). A security domain indicates that principals have compatible security policies. Also, the authenticating entity trusts the PCA to certify the parent organization of the principal that is to be authenticated. That is, $$PCA \bullet Org \quad (5)$$

Also, it is assumed that the authentication entity is required to initiate the authentication chain starting from the top level PCA certificate due to, for example, desired security assurance and liability arrangements. Initially, it is assumed that the authenticating entity knows the top level key of the PCA. The top level key of the PCA is identified as follows:

$$K_{PCA} \bullet PCA \text{ notafter } 00:00 \text{ Aug. } 1, 1996. \quad (6)$$

It will be assumed for brevity's sake that the certifying authorities (subordinate to the PCA) may only assign certificates using hierarchical names subordinate to their own names. That is, $$PCA \bullet PCA/REVOKE\text{-}CA \quad (7)$$

$$\text{Org} \bullet \text{Org/Eve} \tag{8}$$

$$\text{Org} \bullet \text{Org/REVOKE-CA-PTR} \tag{9}$$

However, the policy within the security domain allows specially designated delegation certificates to indicate other trusted entities within the same security domain. That is, the delegation certificate specifies the name of an entity authorized to be recognized as an authority on issuing time stamped revocation certificates. An example is a medium-term delegation certificate indicated by the dashed arrow in FIGS. 5A, 5B and 5C. When the authenticating entity is presented with, for example, a long tern certificate such as X.509, Org is interpreted as follows:

$$K_{PCA} \text{ says}(K_{Org} \bullet \text{Org notafter 00:00 Jan. 1, 1997}) \tag{10}$$

Also, the most recent monthly X.509 certificate revocation list is presented to the authenticating entity as:

$$K_{PCA} \text{ says}(K_{Org} \bullet \text{Org notafter at 00:00 Jan. 1, 1997})\text{at}$$
$$\text{Jun. 1, 1996} \tag{11}$$

The original CRL message need not repeat the field of the original certificate message.

Next, a special certificate for Org/Eve will be explained. The certificate specifies the key for Org/Eve, i.e., $K_{Org/Eve}$, and also designates Org/REVOKE-CA-PTR as an authority for revocation. For the particular type of transaction of interest, Org assumes liability only if a 30 minute recent revocation certificate statement has been obtained. That is:

$$K_{Org} \text{ says}((K_{Org/Eve} \bullet \text{Org/Eve notafter 00:00 Apr. 1,}$$
$$1997) \wedge (\text{Org/REVOKE-CA-PTR}/K_{Org/Eve} \bullet \text{Org/}$$
$$\text{Eve notbefore}(t_{now}-30 \text{ minutes}). \tag{12}$$

The authenticating entity is also presented with the most recent weekly certificate which specifies Org/REVOKE-CA-PTR as the entity Org trusts to serve as a revocation agent. In this example, Org/REVOKE-CA-PTR does not actually exist. Rather, it serves as delegation to a particular revocation agent. This technique enables flexibility in changing the revocation agent without having to reissue the long-term certificate. Org satisfies PCA's requirement that the designated entity be within the security domain. Of course, the agent may serve multiple security domains provided it satisfies the policy for each domain. The "notafter" suffix constrains exposure of the identification authority to future attacks on the revocation service. The effective bound, however, may extend to the least restrictive freshness constraint in any one of the identification certificates. That is, $$K_{Org} \text{ says}(\text{PCA/REVOKE-CA} \bullet \text{Org/REVOKE-CA-}$$
$$\text{PTR notbefore 00:00 Jul. 1, 1996 notafter 00:00}$$
$$\text{Jul. 20, 1996}) \tag{13}$$

A longer certificate can be specified and a different revocation authority can be required to assert it's status. However, each level of indirection comes at an expense.

Also, the long term identification certificate for a central revocation service is given as $$K_{PCA} \text{ says}(K_{PCA/REVOKE-CA} \bullet \text{PCA/REVOKE-CA}$$
$$\text{notafter 00:00 Jan. 1, 1997}). \tag{14}$$

The following revocation agent certifies that Org/Eve's certificate was current at 13:40 Jul. 15, 1996:

$$K_{CPA/REVOKE-CA}/K_{Org/EVE} \text{ says}(K_{Org/Eve} \bullet \text{PCA/RE-}$$
$$\text{VOKE-CA}/K_{Org/EVE} \text{ notbefore 13:40 Jul. 15,}$$
$$1996 \text{ notafter}(13:40 \text{ Jul. 15, 1996}+\delta_{Org} \bullet_{Org/Eve}))$$
$$\text{at 13:40 Jul. 15, 1996.} \tag{15}$$

The time stamp of the certificate message is interpreted as a "notafter" variable in the above statements (14) and (15).

The value of $\delta_{Org} \bullet_{Org/Eve}$ is not made explicit but is interpreted from the original certificate statement (12) issued by Org.

The real certificate can contain one or more original certificates and a time stamp applied by PCA/REVOKE-CA. Alternatively, a condensed version might contain only a dated list of revoked certificates. Note that the agent can be made secure since real-time interaction with a trusted revocation authority is unnecessary for the purposes of this invention.

The primary processing function required by PCA/REVOKE-CA is the off-line function of dating and signing statements. Distribution of this information is made secure using unidirectional links to the directory. To prevent denial of service, these links must be highly reliable. Additionally, multiple revocation agents can be designated.

The certificate path will now be analyzed starting at the node PCA which is trusted by the authenticating entity. The lack of a time stamp in the X.509 certificate prevents a freshness determination from the certificate alone as shown in the statement (10). The CRL statement (11) is needed to determine freshness. Using the statements (5), (6), (10), (P6), (P7), (P8), and applying the transitivity rule for ⇒, the following is obtained:

$$K_{Org} \bullet \text{Org notafter 00:00 Jan. 1, 1997}. \tag{16}$$

Statement (16) illustrates why the analysis is only good for the time of verification. Although the validity of statement (6) is good until 00:00 Aug. 1, 1996, the conclusion is a fact that might wrongfully be interpreted as being valid until 00:00 Jan. 1, 1997.

Using statements (6), (7), (14), (P6), (P7), (P8), and applying the transitivity rule for ⇒, the following is obtained:

$$K_{PCA/REVOKE-CA} \bullet \text{PCA/REVOKE-CA notafter 00:00}$$
$$\text{Jan. 1, 1997} \tag{17}$$

Using statements (8), (12), (16), (P7) and (P8) followed by normalizing the suffix constraint using (P6), the following is obtained:

$$(K_{Org/Eve} \bullet \text{Org/Eve notbefore}(t_{now}-30 \text{ minutes})\text{no-}$$
$$\text{tafter 00:00 Apr. 11, 1997}) \wedge (\text{Org/REVOKE-CA-}$$
$$\text{PTR}/K_{Org/Eve} \bullet \text{Org/Eve notbefore}(t_{now}-30 \text{ min-}$$
$$\text{utes})\text{notafter 00:00 Apr. 1, 1997}). \tag{18}$$

Using statements (9), (13), (16), (P7) and (P8) the following is obtained:

$$\text{PCA/REVOKE-CA} \bullet \text{Org/REVOKE-CA-PTR notbe-}$$
$$\text{fore 00:00 Jul. 13, 1996 notafter 00:00 Jul. 20,}$$
$$1996. \tag{19}$$

Using statement (P6) to normalize the suffix times on statements (18) and (19) and then applying the transitivity rule for ⇒, the following is obtained:

$$(K_{Org/Eve} \bullet \text{Org/Eve notbefore 13:30 Jul. 15, 1996}$$
$$\text{notafter 00:00 Jul. 20, 1996})$$
$$\wedge (\text{PCA/REVOKE-CA}/K_{Org/Eve} \Rightarrow \text{Org/Eve not-}$$
$$\text{before 13:30 Jul. 15, 1996 notafter 00:00 Jul. 20,}$$
$$1996). \tag{20}$$

Using statements (15), (17), (P7) and (P8) the following is obtained:

$$K_{Org/Eve} \bullet \text{PCA/REVOKE-CA}/K_{Org/Eve} \text{ notbefore}$$
$$13:40 \text{ Jul. 15, 1996 notafter}(13:40 \text{ Jul. 15, 1996}+$$
$$\delta_{Org/Eve}). \tag{21}$$

Statements (21) and (20) are normalized using (P6) and the transitivity rule for ⇒ is applied. Like terms are then combined to obtain:

$$K_{Org/Eve} \bullet \text{Org/Eve notbefore 13:40 Jul. 15, 1996}$$
$$\text{notafter 14:10 Jul. 15, 1996}. \tag{22}$$

Since 13:40 Jul. 15, 1996 ≦ ($t_{now}$ 14:00 Jun. 15, 1996) ≦ 14:10 Jul. 15, 1996, it can be concluded that $$K_{Org/Eve} \bullet Org/Eve \quad (23)$$

Figure 5C:
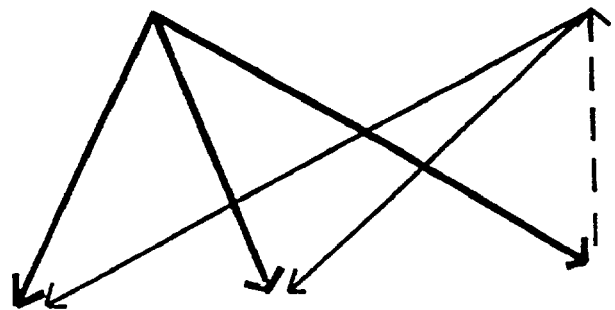
FIG. 5C is a diagram of a certificate topology according to a second embodiment of the present invention.

FIG. 5C is a diagram of a certificate topology according to a second embodiment of the present invention. FIG. 5C is similar to the embodiment in FIG. 5B except that the PCA is not present. in this case, the initial delegating assertion is issued by the first entity to a second entity. The second entity delegates authority to a third entity.

Figure 6:
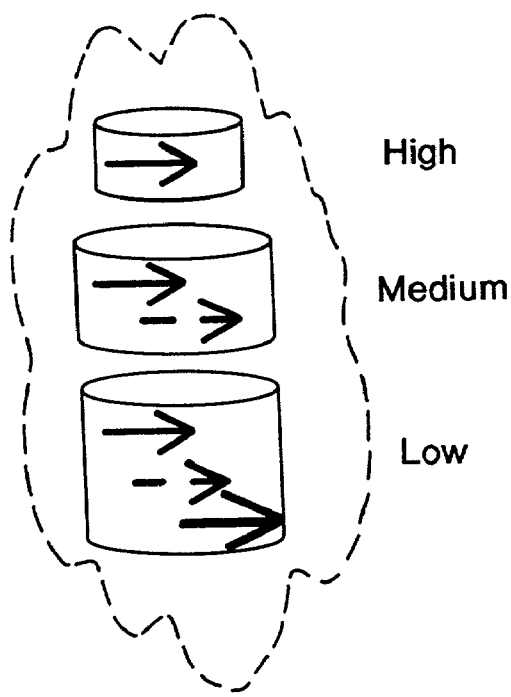
FIG. 6 is a diagram of a replicated directory with storage which can be used with the present invention.

FIG. 6 is a diagram of a replicated directory organized for the propagation of certificates according to the recent-secure delay bounds of authenticating entities. That is, it is a replicated directory with varying levels of persistent storage. This type of directory can be used with any type of certificate topology according to the present invention. It need not be assumed that the directory is trusted. The High level includes items that are replicated frequently including time stamped assertions (i.e., revocation certificates or validity certificates). The Medium level includes items that are replicated often including the time stamped assertions and medium-term delegation assertions. The Low level includes items that are replicated infrequently including the time stamped assertions, the medium-term delegation assertions and long-term identification assertions.

The storage area of the present invention need not be limited to the above example. Rather, the storage area can include a storage system or communications network. The communications network can be a multicast address group.

FIGS. 5A, 5B, 5C, and 6 show that recent-secure authentication uses freshness constraints imposed by the authenticating entity and constraints recommended by intermediary certifiers. The recent-secure authentication of the present invention uses a technique for delegating revocation authority without requiring that the revocation agent be trusted to specify revocation policies. It is assumed that the statements from each channel principal can be ordered and missing statements can be deleted. Also, as set forth above, the order of statements from different sources can be established using clock synchronization. The external synchronization accuracies can also be determined. The recent-secure authentication of the present invention also provides flexibility for changing revocation agents using indirection in long-term certificates. Further, the addition of time stamps to, for example, X.509, may improve the performance for satisfying freshness constraints in specialized architectures in a similar manner as identification assertions.

System specification is a preliminary analysis step. Analysis includes the steps of expressing the channel verification goal in terms of language formulas, deriving new statements by applying statement and principal axioms to system specification statements subject to policy constraints and concluding analysis when a new derived statement achieves a verification goal or terminating analysis.

The present invention provides specifying security protocols and policy constraints for establishing secure channels in distributed systems. It also includes a method and system for refined specification of policies for revocation and validity having a bounded delay. The revocation and validity policies are embodied in freshness constraints imposed on recent-secure (channel) authentication. The present system and method for reasoning about recent-secure authentication and for promulgating revocation policies and validity policies in authenticated statements enables the design of a secure and highly available system for revocation where less trust is required of the revocation and validity service.

Additionally, the present invention enables authenticating entities' on a per transaction basis, to adjust authentication costs at the expense of protection. This is because the present invention makes precise what degree of protection is desired and whether that protection is obtained. Formal recent-secure policies provide a basis for both optimizing the distribution of credentials, e.g., public key identification, revocation and validity assertions, and for designing authentication architectures that are resilient to network partitioning or disconnected operations.

The present invention can also be extended to include a "received notafter" suffix to signal that the integrity of statements received after a specified time has an unacceptably high threshold of being compromised. Message contents cached prior to integrity timeouts, however, might still be usable. Such techniques enable cached assertions to be used past the stated time periods and enable computational efficiencies due to choices in key sizes.

The foregoing is considered as illustrative only of the principles of the present invention. Further, since numerous modifications will readily occur to those skilled in the art, it is not desired to limit the invention to the exact construction and applications shown and described, and accordingly, all suitable modifications and equivalents may be resorted to, falling within the scope of the invention and the appended claims and their equivalents.

The invention claimed is:

1. A system that includes a security policy server, an identification authority server, a revocation authority server, a verification authority server, and a user computer, comprising:

a module within the identification authority server that, pursuant to a first policy that establishes identity of said user in a public network, which policy is received from said security policy server, and a first request from said user computer, prepares and sends to said user computer, via said public network to which said user computer, identification authority server, revocation authority server, and said verification authority server are connected and through which said identification authority server and said revocation authority server interact with said verification authority server and said user computer, an identification certificate that includes a freshness constraint represented by a time duration referenced to time of said first request by said user computer;

a module within said revocation authority server configured to store in a memory that is coupled to said revocation authority via said public network, a validity statement in response to a received second policy that is time-of-day sensitive, and to update said validity statement at specified intervals, said validity statement pertaining solely to said user and including an explicit verification status for said user as of a specified date and time;

means configured to provide, in response to a second request initiated by said user computer, said identification certificate and said validity statement retrieved from said memory, to said verification authority server, via said public network; and a module within said verification authority server configured to verify that said second request is within said time duration and said validity statement permits serving said second request by said user computer.

* * * * *

UNITED STATES PATENT AND TRADEMARK OFFICE
CERTIFICATE OF CORRECTION

| | | |
|---|---|---|
| PATENT NO. | : 7,644,284 B1 | Page 1 of 1 |
| APPLICATION NO. | : 09/840230 | |
| DATED | : April 24, 2001 | |
| INVENTOR(S) | : Stuart Gerald Stubblebine | |

It is certified that error appears in the above-identified patent and that said Letters Patent is hereby corrected as shown below:

In Column 1, Line 11, delete "06/016,788" and replace with "60/016,788"

Signed and Sealed this
Twentieth Day of December, 2011

David J. Kappos
*Director of the United States Patent and Trademark Office*